(12) United States Patent
Ota et al.

(10) Patent No.: US 10,410,423 B2
(45) Date of Patent: Sep. 10, 2019

(54) DISPLAY CONTROL DEVICE FOR CONTROLLING STEREOSCOPIC DISPLAY OF SUPERIMPOSED DISPLAY OBJECT, DISPLAY SYSTEM, DISPLAY CONTROL METHOD AND COMPUTER READABLE MEDIUM

(71) Applicant: MITSUBISHI ELECTRIC CORPORATION, Tokyo (JP)

(72) Inventors: Shuhei Ota, Tokyo (JP); Takashi Hirano, Tokyo (JP); Taro Kumagai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 40 days.

(21) Appl. No.: 15/561,346

(22) PCT Filed: Apr. 17, 2015

(86) PCT No.: PCT/JP2015/061863
§ 371 (c)(1),
(2) Date: Sep. 25, 2017

(87) PCT Pub. No.: WO2016/166887
PCT Pub. Date: Oct. 20, 2016

(65) Prior Publication Data
US 2018/0061134 A1 Mar. 1, 2018

(51) Int. Cl.
*G06T 19/00* (2011.01)
*B60K 35/00* (2006.01)
(Continued)

(52) U.S. Cl.
CPC ............ *G06T 19/006* (2013.01); *B60K 35/00* (2013.01); *B60R 1/00* (2013.01); *G08G 1/165* (2013.01);
(Continued)

(58) Field of Classification Search
None
See application file for complete search history.

(56) References Cited

U.S. PATENT DOCUMENTS

2004/0193331 A1  9/2004  Kashiwada et al.
2014/0268353 A1  9/2014  Fujimura et al.
(Continued)

FOREIGN PATENT DOCUMENTS

EP    2 412 557 A1   2/2012
JP    8-197981 A     8/1996
(Continued)

*Primary Examiner* — Jeffrey J Chow
(74) *Attorney, Agent, or Firm* — Birch, Stewart, Kolasch & Birch, LLP

(57) ABSTRACT

An HUD superimposes a display object, as a stereoscopic image or a planar image, on an actual scene. A display control device acquires information about a moving object and information about surrounding and estimates a relative distance between a display obstacle and the moving object. When it is determined that the display obstacle exists or can exist between the display object and the moving object, the display control device changes the display mode of the display object in accordance with the amount of change in the relative distance and notifies the HUD of the display mode.

15 Claims, 15 Drawing Sheets

(51) Int. Cl.
*B60R 1/00* (2006.01)
*H04N 7/18* (2006.01)
*H04N 13/156* (2018.01)
*H04N 13/30* (2018.01)
*G08G 1/16* (2006.01)
*H04N 13/361* (2018.01)
*G06K 9/00* (2006.01)

(52) U.S. Cl.
CPC ............. *G08G 1/166* (2013.01); *H04N 7/181* (2013.01); *H04N 13/156* (2018.05); *H04N 13/30* (2018.05); *B60K 2350/2017* (2013.01); *B60K 2350/2052* (2013.01); *B60K 2350/352* (2013.01); *B60K 2350/962* (2013.01); *B60R 2300/205* (2013.01); *B60R 2300/70* (2013.01); *G06K 9/00805* (2013.01); *G06T 2219/2004* (2013.01); *H04N 13/361* (2018.05)

(56) References Cited

U.S. PATENT DOCUMENTS

| | | | |
|---|---|---|---|
| 2016/0170487 A1* | 6/2016 | Saisho | G01C 21/3635 |
| | | | 345/156 |
| 2016/0216521 A1* | 7/2016 | Yachida | G01C 21/365 |
| 2017/0187963 A1* | 6/2017 | Lee | G06F 3/013 |

FOREIGN PATENT DOCUMENTS

| | | |
|---|---|---|
| JP | 2004-302643 A | 10/2004 |
| JP | 2005-69799 A | 3/2005 |
| JP | 2006-31618 A | 2/2006 |
| JP | 2010-221630 A | 10/2010 |
| JP | 2011-64760 A | 3/2011 |
| JP | 2011-244465 A | 12/2011 |
| JP | 2015-69656 A | 4/2015 |

\* cited by examiner

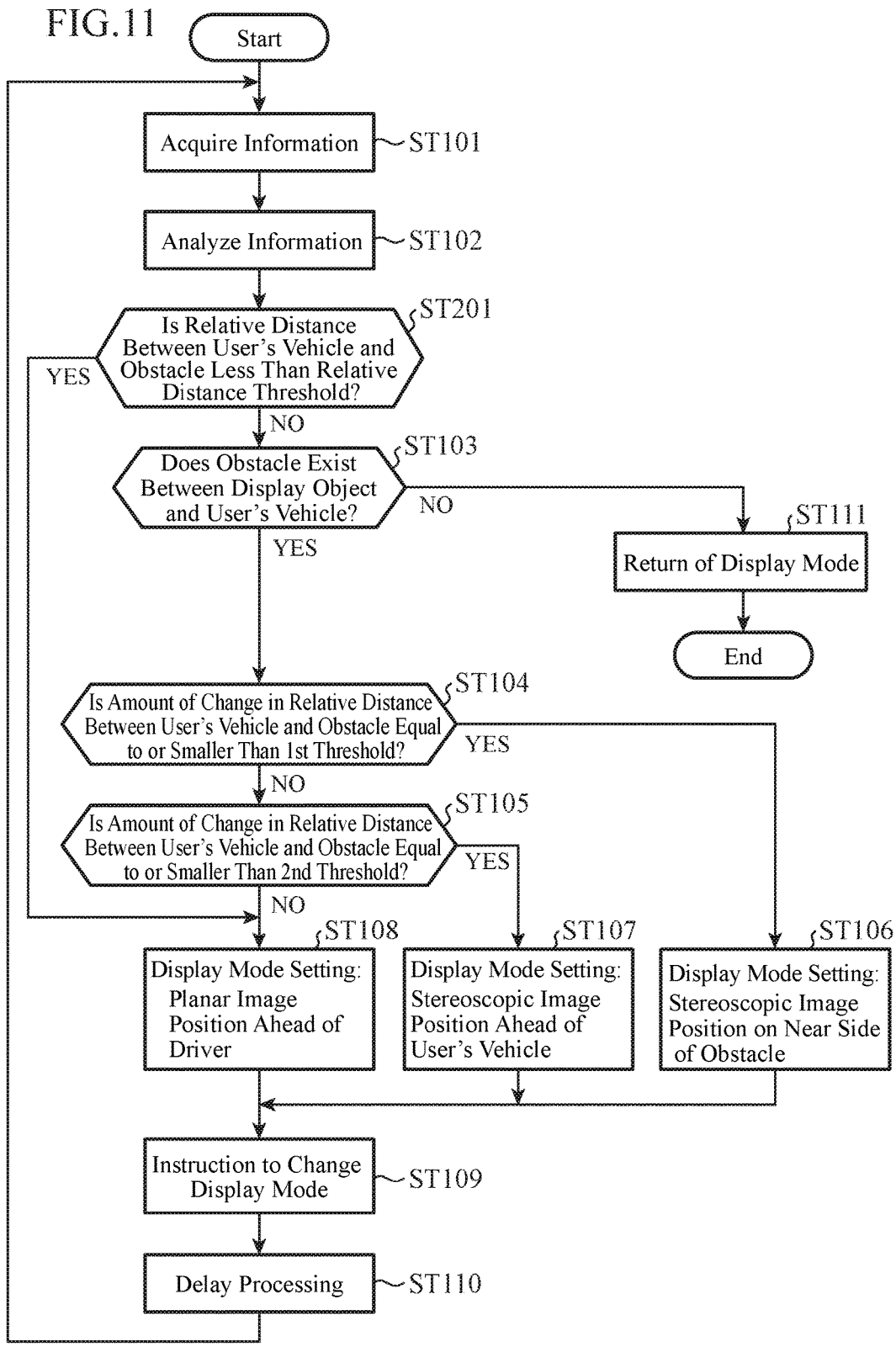

DISPLAY CONTROL DEVICE FOR CONTROLLING STEREOSCOPIC DISPLAY OF SUPERIMPOSED DISPLAY OBJECT, DISPLAY SYSTEM, DISPLAY CONTROL METHOD AND COMPUTER READABLE MEDIUM

TECHNICAL FIELD

The present invention relates to a display control device for controlling a display device that can display a display object to be superimposed on an actual scene as a stereoscopic image, a display system, a display control method, and a display control program.

BACKGROUND ART

A display device of HUD (Head Up Display) type mounted in a vehicle enables a driver to check required information almost without turning his or her eyes from a field of forward view while the driver is driving the vehicle (for example, refer to Patent Literature 1). In recent years, an HUD by which a three-dimensional stereoscopic image can be displayed by adding a depth direction to the display position of information is proposed (for example, refer to Patent Literature 2). In this HUD, by superimposing a display object which is a stereoscopic image on a target object in an actual scene, the parallax between the display object and the target object is eliminated. As a result, a driver can visually recognize information more intuitively. Further, for example, by superimposing a graphic such as an arrow showing the direction toward which the vehicle should make a turn stereoscopically on a road at an intersection, a driver can understand the direction and position of next turning more intuitively compared with a case of displaying a two-dimensional planar image ahead of the driver.

CITATION LIST

Patent Literature

Patent Literature 1: Japanese Unexamined Patent Application Publication No. 2004-302643
Patent Literature 2: Japanese Unexamined Patent Application Publication No. 2006-31618

SUMMARY OF INVENTION

Technical Problem

However, depending on the situation, there is a possibility that visually recognizing a display object which is a stereoscopic image is a load on the driver. As an example, there is a phenomenon in which a display object which is a stereoscopic image is recognized visually as if the display object penetrates an actually existing obstacle. In this phenomenon, when an obstacle, such as a preceding vehicle, exists between a driver and a display object, the driver can visually recognize the display object which cannot be recognized visually under normal circumstances because the display object is hidden by the obstacle, in a mode in which the display object exists as if it penetrates the obstacle. Under this situation, because the driver feels that something is strange in the visual recognition of the display object, there is an undesirable possibility that the driver cannot understand the information intuitively.

In the display device according to above-mentioned Patent Literature 1, when the penetration of a display object which is a planar image through an obstacle occurs, the display position of the display object is moved to a position which is similar to the position of the obstacle in the depth direction, and the display object is superimposed on the obstacle, thereby improving the visibility of the display object. However, in this display device, a display object which is a planar image is assumed as a display target, so that penetration of a display object which is a stereoscopic image is not taken into consideration. Therefore, there is a problem that a phenomenon in which a display object which is a stereoscopic image penetrates an obstacle still occurs.

The present invention is made in order to solve the above-described problem, and it is therefore an object of the present invention to provide a technique for preventing a phenomenon in which a display object is displayed as if it penetrates an obstacle in a display device that can display a three-dimensional stereoscopic image.

Solution to Problem

According to the present invention, the display control device controls a display device that can superimpose a display object, as a stereoscopic image, on an actual scene, and the display control device includes: an information acquiring unit acquiring information about a moving object and information about surroundings; an information analyzing unit estimating a relative distance between a display obstacle and the moving object by using the information acquired by the information acquiring unit, and determining whether the display obstacle exists between the display object which is superimposed on an actual scene, and the moving object; a display determining unit changing a display mode of the display object in accordance with an amount of change in the relative distance when the information analyzing unit determines that the display obstacle exists between the display object and the moving object; and a display instructing unit instructing the display device to display the display object in the display mode changed by the display determining unit. The display determiner compares the amount of change in the relative distance with a first threshold value, and, when the amount of change in the relative distance is greater than the first threshold value, determines to display the display object, as a stereoscopic image, at a predetermined first position ahead of the moving object.

Advantageous Effects of Invention

According to the present invention, when a display obstacle exists between a display object, which is superimposed on an actual scene, and a moving object, the display mode of the display object is changed in accordance with the amount of change in the relative distance between the display obstacle and the moving object. As a result, in a display device that can display a three-dimensional stereoscopic image, it is possible to prevent a phenomenon in which a display object is displayed as if it penetrates a display obstacle.

BRIEF DESCRIPTION OF DRAWINGS

FIG. 11 is a flow chart showing an operation of a display control device according to Embodiment 2;

DESCRIPTION OF EMBODIMENTS

Hereafter, in order to explain this invention in detail, some embodiments of the present invention will be described with reference to the accompanying drawings.

Embodiment 1

Figure 1:
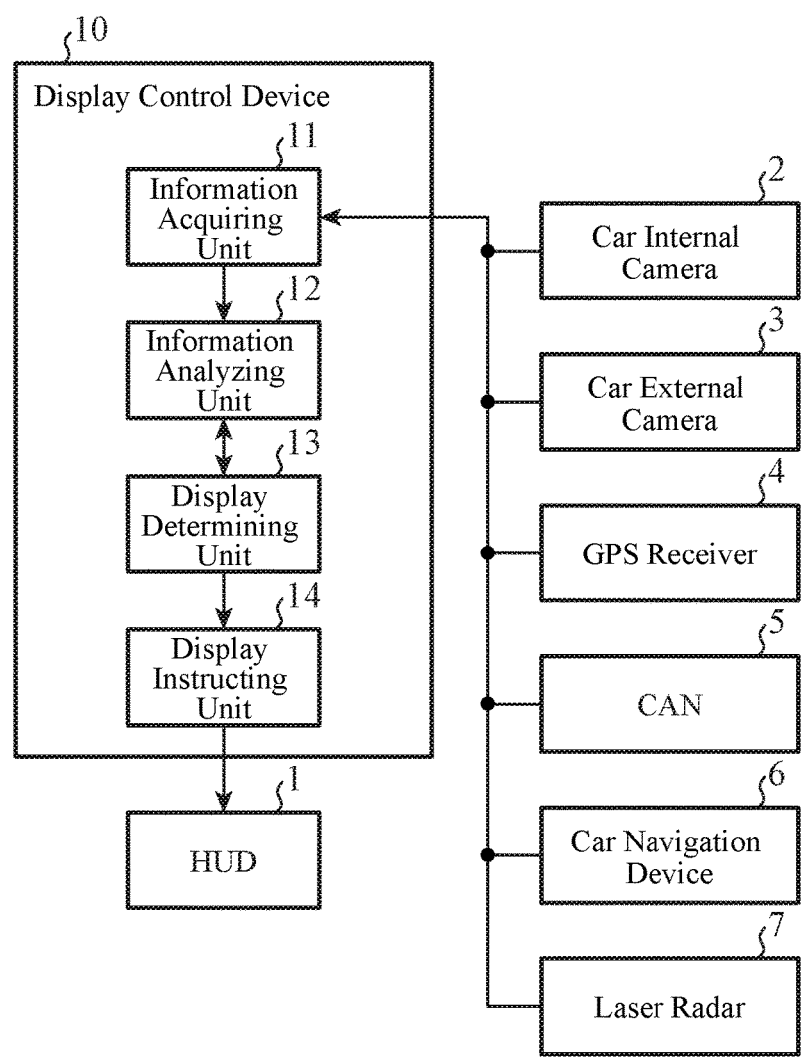
FIG. 1 is a block diagram showing an example of a configuration of a display system according to Embodiment 1 of the present invention.

FIG. 1 is a block diagram showing an example of a configuration of a display system according to Embodiment 1 of the present invention. The display system is mounted in a vehicle, and includes an HUD 1 that can display a display object as a three-dimensional stereoscopic image or a two-dimensional planar image, and a display control device 10 that controls the HUD 1. To the display control device 10, as peripheral devices, at least one of a car internal camera 2, a car external camera 3, a GPS (Global Positioning System) receiver 4, a CAN (Controller Area Network) 5, a car navigation device 6, and a laser radar 7 is connected.

The HUD 1 displays a display object, as a stereoscopic image or a planar image, in accordance with an instruction from the display control device 10 which will be described later. This HUD 1 is configured so as to enable the driver to visually recognize a display object by, for example, displaying an image of the display object on a high-brightness liquid crystal display, and reflecting the screen of the liquid crystal display on a half mirror. The half mirror may be the windshield of the vehicle, a combiner mounted between the windshield and the driver, or the like. With this configuration, the driver can see an actual scene which is visible through the windshield or the like and the display object to be superimposed to each other.

The display control device 10 includes: an information acquiring unit 11 that acquires information about the user's vehicle and information about the surroundings of the user's vehicle from peripheral devices; an information analyzing unit 12 that analyzes a positional relationship among the user's vehicle, a display object, and a display obstacle by using the information acquired by the information acquiring unit 11; a display determining unit 13 that changes the display mode of the display object in accordance with the positional relationship analyzed by the information analyzing unit 12; and a display instructing unit 14 that instructs the HUD 1 to display the display object in the display mode changed by the display determining unit 13.

The display object is an image displayed on the HUD 1. The display object is, for example, navigation information or the like which the car navigation device 6 outputs. As navigation information, a guide arrow showing a direction toward which the vehicle should make a turn at the next guide point, the distance to the next guide point, the name of the guide point, a guide sign showing a parking area, a junction or the like during when the vehicle is traveling on a highway, the name of a destination, and so on are provided. Further, a display object may be information such as the distance between the user's vehicle and a preceding vehicle, the distance being detected by, for example, the car external camera 3 or the laser radar 7. Moreover, a display object may be CAN information, such as the speed of the user's vehicle, the steering angle of the user's vehicle, the amount of remaining fuel of the user's vehicle, or a warning, which is transmitted and received between vehicle-mounted devices via the CAN 5. The information content of the display object is not limited to one of the above examples, and the display object may be any information content as long as the display object can be displayed on the HUD 1.

The display mode of a display object means the information content, the display position, the display shape, the size of the display object, and the dimension of the image (a planar image or a stereoscopic image).

A stereoscopic image is a display object which is viewed, for the driver, as if the display object has a depth, and a planar image is a display object which is displayed only on a certain plane and which is viewed, for the driver, as if the display object has no depth. A display object that is displayed on the HUD 1 as a stereoscopic image is referred to as a "stereoscopic display object", and a display object that is displayed on the HUD 1 as a planar image is referred to as a "planar display object."

The HUD 1 displays a display object as a planar image or a stereoscopic image by utilizing, for example, an optical illusion using an image for the right eye and an image for the left eye.

The display position of a display object is the position at which a driver visually recognizes the display object displayed by the HUD 1. The HUD 1 can change the display position of a display object in a depth direction, in an upward or downward direction, and in a right or left direction viewed from the driver. The depth direction is the direction which is directed from the driver to the side ahead of the vehicle. For example, the HUD 1 changes the display position of a display object by using an optical illusion which is mentioned above, or by moving a projector, half mirror or the like.

The display shape of a display object is the shape of the display object displayed by the HUD 1.

By changing the shape of a display object in each of the image for right eye and the image for left eye, the angle of elevation of the display object is changed, the display object is rotated, or the display object is bent when the HUD 1 displays the display object.

Note that, the method of changing the display mode is not limited to the above-mentioned examples.

Figure 2A:
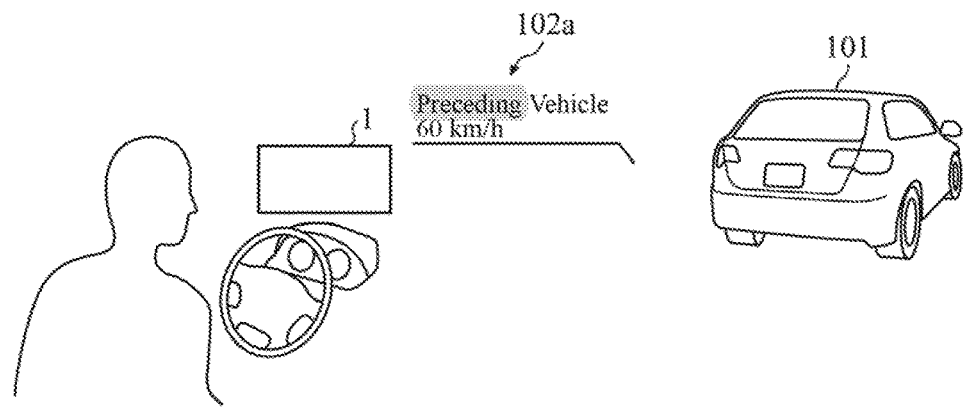
FIGS. 2A and 2B are diagrams showing an example in which an HUD displays a display object as a planar image or a stereoscopic image.

Hereafter, an example of displaying a display object as a planar image is shown in FIG. 2A. The HUD 1 superimposes, for example, a planar display object 102*a*, such as "Preceding Vehicle 60 km/h" showing that a preceding vehicle 101 is traveling at 60 km/h, on an actual scene ahead of the vehicle in which the preceding vehicle 101 exists, thereby enabling the driver to visually recognize the planar display object 102*a* almost without turning his or her eyes from a field of view in foreground. However, when the display position in the depth direction of the planar display object 102*a* is set to a fixed position constantly, as shown in the example of FIG. 2A, parallax occurs between the preceding vehicle 101 and the planar display object 102*a* dependently on the relative distance between the preceding vehicle 101 and the user's vehicle.

Figure 2B:
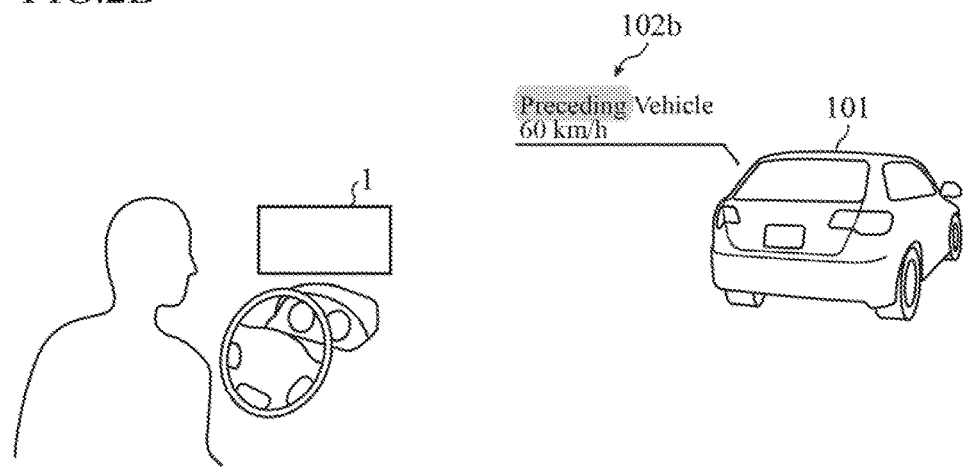

On the other hand, an example of displaying a display object as a stereoscopic image is shown in FIG. 2B. The HUD 1 changes the display position of the stereoscopic display object 102*b* dependently on the relative distance between the preceding vehicle 101 and the user's vehicle in such a way that the stereoscopic display object 102*b* is superimposed on the preceding vehicle 101. As a result, the parallax occurring between the preceding vehicle 101 and a stereoscopic display object 102*b* is eliminated, and consequently, the driver can intuitively grasp the content of the stereoscopic display object 102*b*.

Figure 3A:
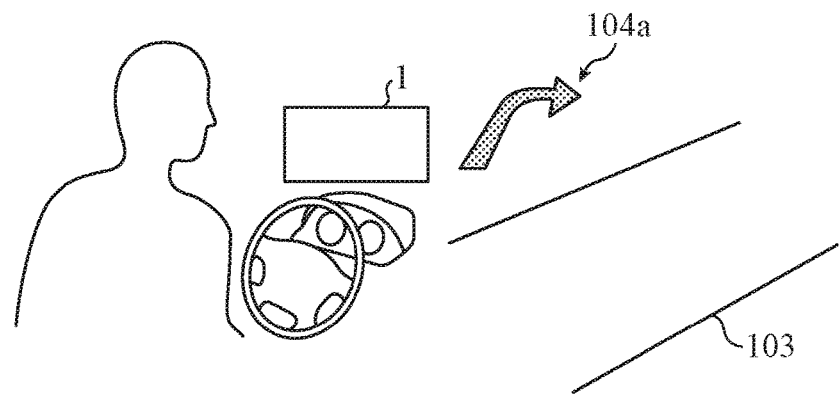
FIGS. 3A and 3B are diagrams showing another example in which the HUD displays a display object as a planar image or a stereoscopic image.
Figure 3B:
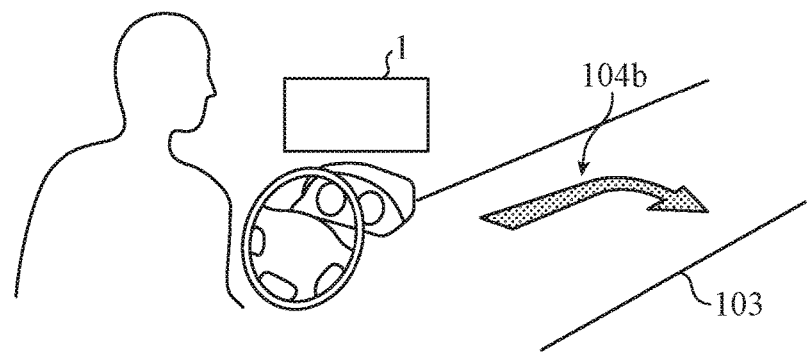

FIG. 3A shows an example in a case where a display object is displayed as a planar image, and FIG. 3B shows an example in a case where a display object is displayed as a stereoscopic image. The arrow-shaped planar display object 104*a* and the arrow-shaped stereoscopic display object 104*b* are guide arrows showing the direction to which the user's vehicle should make a turn at the next guide point. The stereoscopic display object 104*b* which is superimposed on a road 103 and displayed stereoscopically, as shown in FIG. 3B, makes it possible for the driver to grasp both the direction to which and the place where the vehicle should make a turn the next time more intuitively compared with the planar display object 104*a* displayed on a plane at a predetermined fixed position as shown in FIG. 3A.

Next, the details of the display control device 10 will be explained.

The information acquiring unit 11 acquires information about the user's vehicle or information about the surroundings of the user's vehicle from the car internal camera 2, the car external camera 3, the GPS receiver 4, the CAN 5, the car navigation device 6, and the laser radar 7. Hereafter, the information about the user's vehicle is referred to as the "vehicle information", and the information about the surroundings of the user's vehicle is referred to as the "surroundings information."

The information analyzing unit 12 analyzes the vehicle information and the surroundings information acquired by the information acquiring unit 11, determines a display object to be displayed on the HUD 1, and outputs the display object to the display determining unit 13. It is assumed that initial display mode information in which an initial display mode is defined for each of display object types is stored in the display control device 10 in advance.

The information analyzing unit 12 also analyzes the vehicle information and the surroundings information acquired by the information acquiring unit 11, and determines a status of the user's vehicle, a status of the surroundings of the user's vehicle, and a status of the driver, passengers and so on in the user's vehicle.

The information analyzing unit 12 further determines whether a display obstacle exists in the surroundings of the user's vehicle on the basis of the status of the surroundings of the user's vehicle, and, when a display obstacle exists, estimates both the relative distance between this display obstacle and the user's vehicle and the type of the display obstacle and stores them. The information analyzing unit 12 then acquires information about the display position of the display object which the HUD 1 is instructed to display from the display determining unit 13, determines whether a display obstacle exists between the display object and the user's vehicle, and outputs the relative distance, a result of the determination, and so on to the display determining unit 13.

A display obstacle is, for example, another vehicle existing in the surroundings of the user's vehicle, a roadside fixed object such as a guardrail, an uphill road, or the like. For such a display obstacle, there is a possibility that a display object may be displayed as if it penetrates the display obstacle.

The status of the user's vehicle is, for example, the speed, the steering angle, the current position, or the traveling direction of the user's vehicle. The information analyzing unit 12 determines the status of the user's vehicle by using, for example, a captured image which the car internal camera 2 acquires by taking images of the interior of the user's vehicle, a captured image which the car external camera 3 acquires by taking images of the surroundings of the user's vehicle, GPS information which the GPS receiver 4 receives from the GPS satellites, CAN information transmitted and received via the CAN 5, navigation information generated by the car navigation device 6, or the like.

The status of the surroundings of the user's vehicle is, for example, the position of another vehicle in the surroundings of the user's vehicle, the existence or non-existence and the position of a roadside fixed object such as a guardrail, road conditions such as the number of lanes of the road, the degree of curve of the road, an uphill or a downhill of the road, or the like. The information analyzing unit 12 determines the status of surroundings of the user's vehicle by using, for example, a captured image which the car external camera 3 acquires by taking images of the surroundings of the user's vehicle, the GPS information received by the GPS receiver 4, the CAN information acquired via the CAN 5, map information received from the car navigation device 6, three dimensional information detected by the laser radar 7, or the like.

The status of the driver is, for example, the line of sight of the driver, the position of the head of the driver, or the like. The information analyzing unit 12 determines the status of the driver and estimates the position of the driver, by using a captured image which the car internal camera 2 acquires by taking images of the interior of the user's vehicle.

The display determining unit 13 receives pieces of information including the information about the display object to be displayed on the HUD 1, the relative distance between the display obstacle and the user's vehicle, and the result of the determination of whether the display obstacle exists between the display object and the user's vehicle, from the information analyzing unit 12. The display determining unit 13 then sets and stores the display mode of the display object on the basis of those pieces of information, and also outputs the display mode to the display instructing unit 14. A method of setting the display mode performed by the display determining unit 13 will be described later.

The display instructing unit 14 receives information for setting the display mode of the display object from the display determining unit 13. The display instructing unit 14 then instructs the HUD 1 to display the display object in the display mode set by the display determining unit 13.

When changing the display mode of the display object, the display instructing unit 14 may output an instruction to gradually change the display position of the display object to the HUD 1, or output an instruction to instantaneously change the display position to the HUD 1. In the same manner as the display position, the display instructing unit may output an instruction to gradually change the display shape of the display object, or output an instruction to instantaneously change the display shape.

Figure 4:
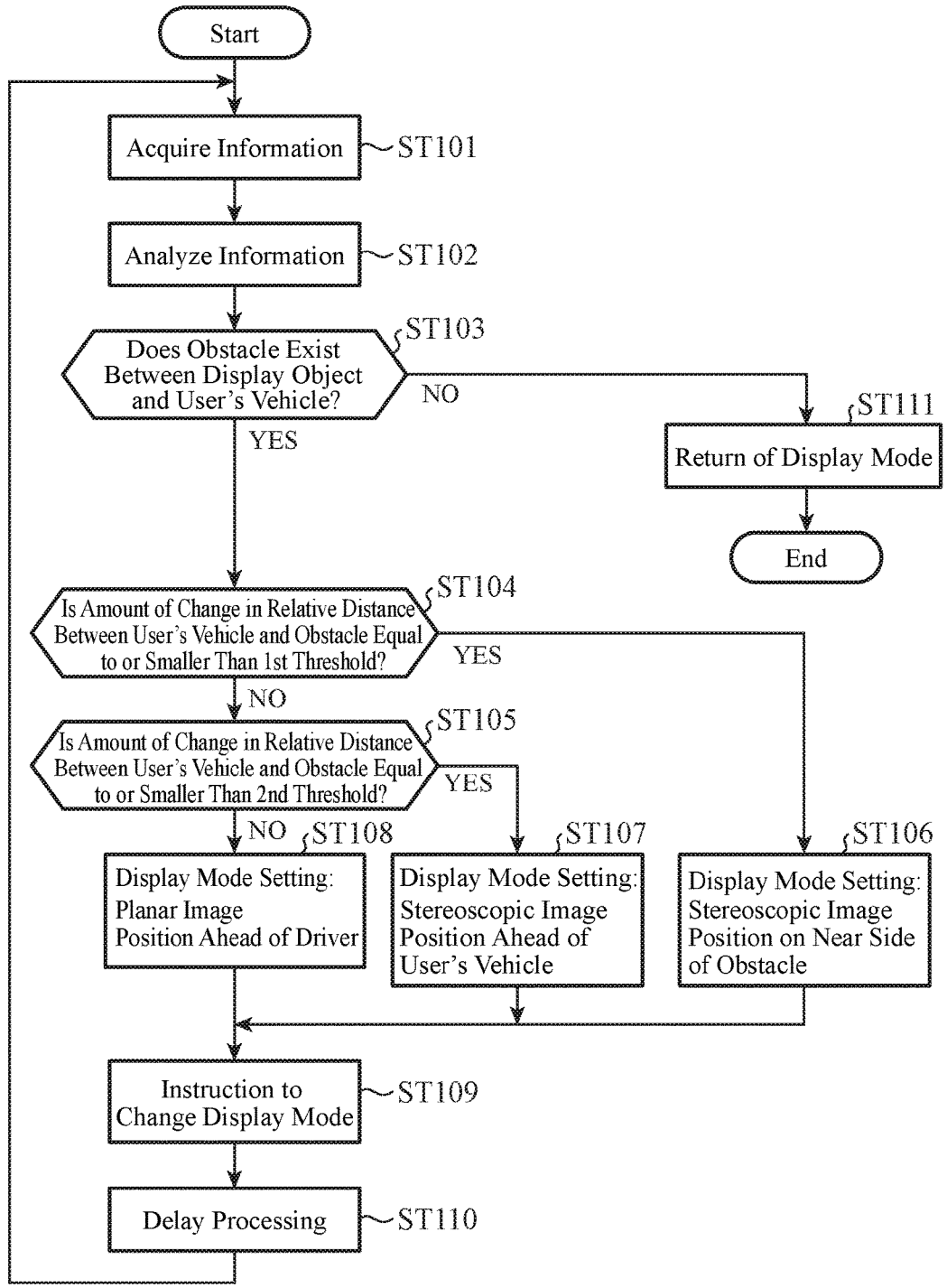
FIG. 4 is a flow chart showing an operation of a display control device according to Embodiment 1.

Next, an operation of the display control device 10 according to Embodiment 1 will be explained using a flow chart shown in FIG. 4. The display control device 10 repeats the operation shown in this flow chart from turning on to turning off of the engine of the vehicle, or from turning on to turning off of the display control device 10 or the HUD 1.

Further, in the following explanation, it is assumed that the following operations are already performed: the information analyzing unit 12 received information about a display object to be displayed on the HUD 1 from peripheral devices via the information acquiring unit 11, and outputted the information about the display object to the display determining unit 13; the display determining unit 13 set a display mode on the basis of the initial display mode information about this display object; and the display instructing unit 14 instructed the HUD 1 to display the display object in the display mode. For example, in such a state, as shown in FIG. 3B, a stereoscopic display object 104b is displayed on a road 103 ahead of the user's vehicle.

The information acquiring unit 11 acquires the vehicle information and the surroundings information from peripheral devices, and outputs them to the information analyzing unit 12 (step ST101).

The information analyzing unit 12 receives the vehicle information and the surroundings information from the information acquiring unit 11 and analyzes them (step ST102), and estimates the relative distance between a display obstacle, such as a preceding vehicle, and the user's vehicle. The relative distance estimated at this time is, for example, the shortest distance between the rear end of the display obstacle, such as a preceding vehicle, and the front end of the user's vehicle.

Further, the information analyzing unit 12 acquires the information about the display position of the display object currently displayed on the HUD 1 from the display determining unit 13, and determines whether the display obstacle exists between this display object and the user's vehicle (step ST103). The information analyzing unit 12 outputs information including the relative distance between the display obstacle and the user's vehicle and a result of the determination to the display determining unit 13. Also when the information analyzing unit 12 is not able to recognize any display obstacle ahead of the user's vehicle, it is determined that there is no display obstacle between the display object and the user's vehicle.

In the above explanation, in step ST103, the information analyzing unit 12 determines whether the display obstacle exists between the display object and the user's vehicle. Further, the information analyzing unit may determine whether a display obstacle having a possibility to come to a position between a display object and the user's vehicle exists. Moreover, the information analyzing unit 12 may determine whether a display obstacle exists between the display object and the driver in the user's vehicle, instead of determining whether a display obstacle exists between the display object and the user's vehicle.

Hereafter, a determining method which the information analyzing unit 12 executes in step ST103 will be explained with reference to FIG. 5.

In Embodiment 1, it is assumed that a display object is displayed at a position in the distance A in the range between 0 meters and 20 meters ahead of the user's vehicle, even though the distance depends on the type of the display object. Therefore, also as the initial display mode information about the display object, the display position is set to a certain position in the distance A from 0 meters to 20 meters ahead of the user's vehicle 100.

When a preceding vehicle 101a exists between a stereoscopic display object 105 to be displayed on the HUD 1 and the user's vehicle 100, there occurs a phenomenon in which the display object is displayed as if it penetrates the preceding vehicle 101a. On the other hand, because another preceding vehicle 101b exists on the far side of the stereoscopic display object 105, such a penetrating display does not occur.

In order to prevent the display object from the penetrating display, it is necessary to change the display position of the display object to a position closer to the user's vehicle 100 with respect to the preceding vehicle 101a. To this end, the information analyzing unit 12 determines whether the display obstacle, such as the preceding vehicle 101a, exists between the user's vehicle 100 and the stereoscopic display object 105, thereby determining whether the penetrating display has occurred. Alternatively, the information analyzing unit 12 may determine whether the display obstacle exists between the driver of the user's vehicle 100 and the stereoscopic display object 105. In the determination of step ST103, the position of the farthest part of the display object when viewed from the user's vehicle is assumed to be the position of the display object, and the position of the nearest part of the display obstacle when viewed from the vehicle is assumed to be the position of the display obstacle.

As an alternative, the information analyzing unit 12 may determine whether there is a possibility that a display obstacle exists between the user's vehicle 100 and the stereoscopic display object 105. For example, the distance A from 0 meters to 20 meters ahead of the user's vehicle 100 is set as a display mode change distance, and the information analyzing unit 12 determines whether the display obstacle, such as a preceding vehicle 101a, exists within the distance A which is the display mode change distance, thereby determining whether or not there is a possibility that the penetrating display occurs.

On the other hand, in Embodiment 1, no display object is displayed within a distance B from 20 meters to 40 meters ahead of the user's vehicle 100. Therefore, even if a preceding vehicle 101c exists within this distance B, any display object does not penetrates the preceding vehicle 101c. However, when the relative distance between the user's vehicle 100 and the preceding vehicle 101c changes largely in a short time due to a sudden slowing down of the preceding vehicle 101*c* or the like, there is a possibility that the preceding vehicle 101*c* enters the distance A immediately after the change. Therefore, in order to prevent the penetrating display of a display object more certainly, it is desirable to set the distance B from 20 meters to 40 meters ahead of the user's vehicle 100 as a display mode change distance, in addition to the distance A from 0 meters to 20 meters ahead of the user's vehicle 100.

Figure 5:
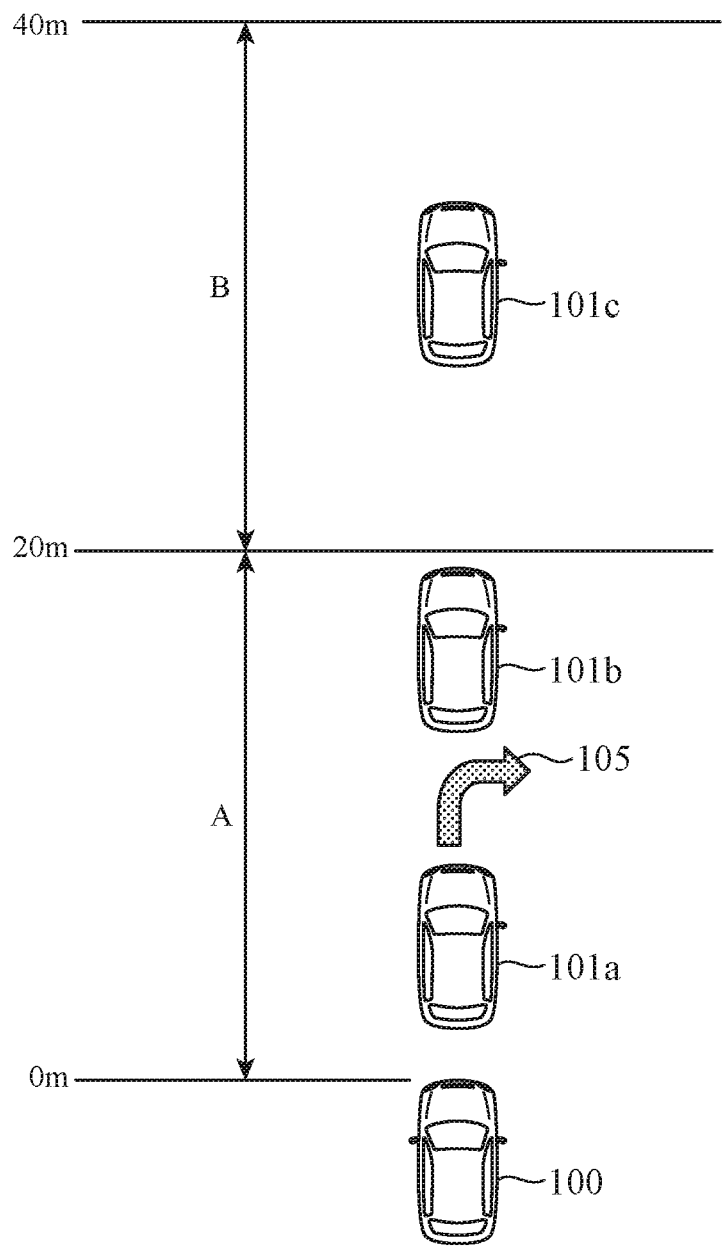
FIG. 5 is a diagram for explaining a positional relationship among a display object, a vehicle, and a display obstacle in Embodiment 1.

Note that, the distances A and B shown in FIG. 5 are merely examples, and the display mode change distances are not limited to these values.

Figures 6A, 6B, 6C, 6D:
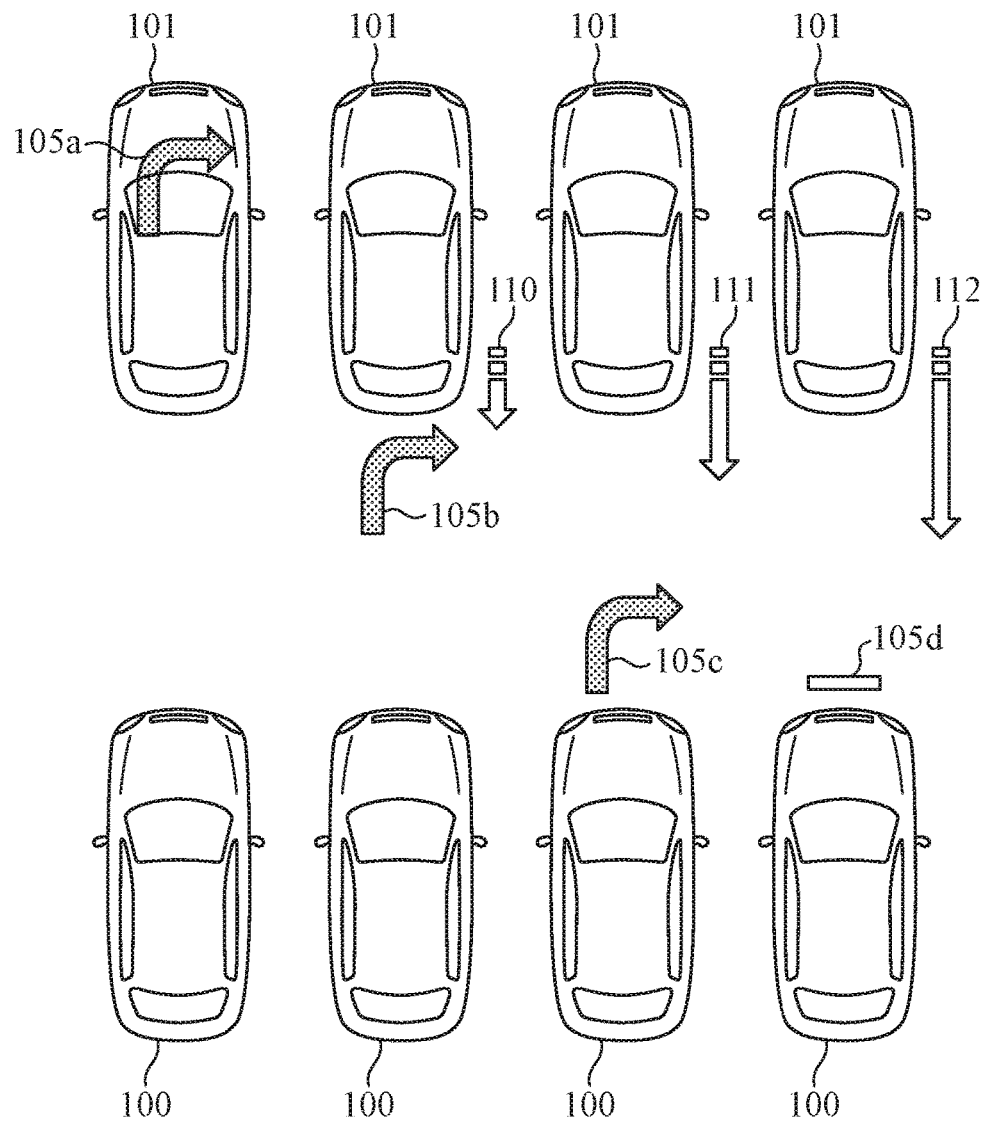
FIGS. 6A to 6D are diagrams showing an example in which a display mode of the display object is changed in Embodiment 1.
Figure 7A:
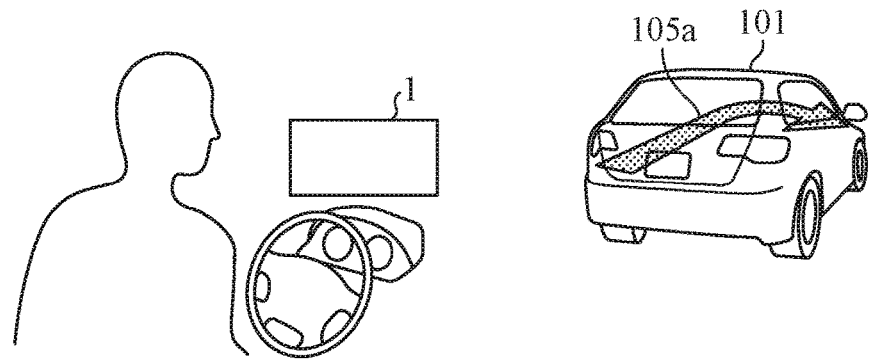
FIGS. 7A and 7B are diagrams showing states in which the display object shown in FIGS. 6A and 6B is viewed from a driver of a user's vehicle.

FIGS. 6A to 6D show an example of a change of the display mode of a display object. When a stereoscopic display object 105*a* is displayed at a position at which it overlaps a preceding vehicle 101 which is a display obstacle, as shown in FIG. 6A, there occurs a phenomenon in which this stereoscopic display object 105*a* is displayed as if it penetrates the preceding vehicle 101. FIG. 7A shows the situation in which the phenomenon, in which the stereoscopic display object 105*a* is displayed as if it penetrates the preceding vehicle 101, is viewed from the driver of the user's vehicle.

When the information analyzing unit 12 determines that the display obstacle exists between a display object and the user's vehicle, the phenomenon in which the display object is displayed as if it penetrates the display obstacle occurs, as shown in FIG. 6A.

Further, when the information analyzing unit 12 determines that a display obstacle exists within the display mode change distance, there is a possibility that a phenomenon in which a display object is displayed as if it penetrates the display obstacle occurs, unless the display position of the display object is changed.

Thus, the display control device 10 performs processes of step ST104 and subsequent steps, so as to eliminate penetration and avoid the recurrence of penetration, or prevent the occurrence of penetration.

When the information analyzing unit 12 determines that a display obstacle exists between the display object and the user's vehicle or a display obstacle exists within the display mode change distance ("YES" in step ST103), the display determining unit 13 stores the relative distance between the display obstacle and the user's vehicle. The display determining unit 13 further calculates the amount of change between: the relative distance between the display obstacle and the user's vehicle which is stored the last time; and the relative distance between the display obstacle and the user's vehicle which is received from the information analyzing unit 12 this time, and determines whether or not the amount of change in the relative distance is equal to or smaller than a predetermined first threshold value (step ST104).

When the amount of change in the relative distance is equal to or smaller than the first threshold value ("YES" in step ST104), the display determining unit 13 sets the display object which the HUD 1 displays to be a stereoscopic image, and sets the display mode in such a way that the display object is displayed at a predetermined position on the near side of the display obstacle (step ST106). This is because when the amount of change in the relative distance is small, the possibility that the display object and the display obstacle will overlap each other immediately after the determination is low, and it is therefore preferable that the display object is displayed at a position closer to its initial display position as much as possible, which is near the display obstacle. Further, because the possibility that the relative distance between the display obstacle and the user's vehicle changes rapidly is low, the possibility that the penetration phenomenon occurs is low even if the display object is displayed as a stereoscopic image.

It is preferable that the display determining unit 13 sets the "predetermined position on the near side of the display obstacle" on the basis of, for example, both the position of the display obstacle which is used for the estimation of the relative distance, and a predetermined distance.

Figure 7B:
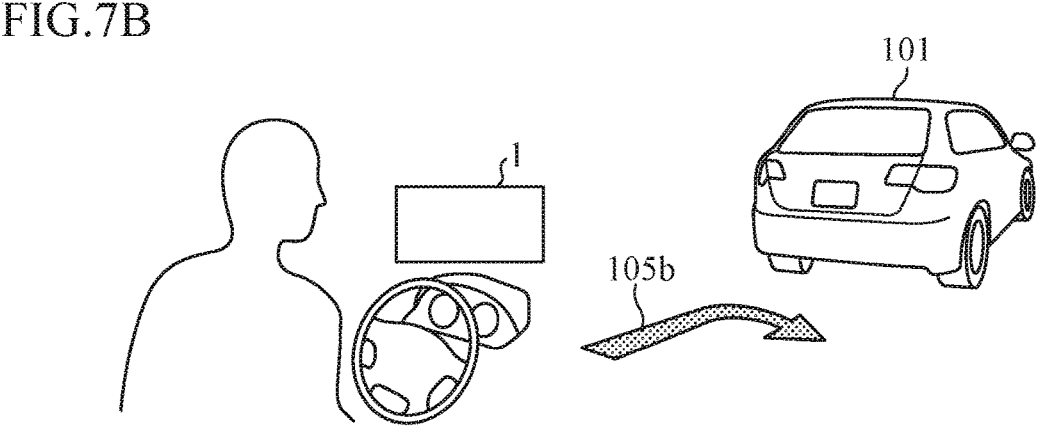

In FIG. 6B, an example in which a stereoscopic display object 105*b* is displayed at a predetermined position behind the preceding vehicle 101 is shown. In FIG. 6A, a penetration phenomenon occurs in the stereoscopic display object 105*a* because the stereoscopic display object is displayed at the same position as the preceding vehicle 101. On the other hand, in FIG. 6B, no penetration phenomenon occurs in the stereoscopic display object 105*b* because the stereoscopic display object is displayed behind the preceding vehicle 101. The stereoscopic display object 105*b* which is viewed from the driver of the user's vehicle is shown in FIG. 7B.

Note that, in FIGS. 6B, 6C and 6D, the amounts of change in the relative distance between the preceding vehicle 101 and the user's vehicle 100 are denoted by arrows showing relative distance change amounts 110, 111 and 112, respectively. It is shown that the longer the length of each arrow is, the larger the amount of change in the relative distance is.

On the other hand, when the amount of change in the relative distance between the display obstacle and the user's vehicle is greater than the first threshold value ("NO" in step ST104), the display determining unit 13 determines whether the amount of change in the relative distance is equal to or smaller than a predetermined second threshold value (step ST105). It is assumed that the second threshold value is greater than the first threshold value.

When the amount of change in the relative distance is equal to or smaller than the second threshold value ("YES" in step ST105), the display determining unit 13 sets the display object which the HUD 1 displays to be a stereoscopic image, and sets the display mode in such a way that the display object is displayed at a predetermined position ahead of the user's vehicle (step ST107). This is because when the amount of change in the relative distance is large, the possibility that the display object and the display obstacle will overlap each other immediately after the determination is high, and it is therefore preferable that the display object is displayed at a position farther from the display obstacle as much as possible, and closer to the user's vehicle. By displaying the display object at a position apart from the display obstacle, the possibility that a penetration phenomenon occurs is low even when the relative distance between the display obstacle and the user's vehicle changes rapidly.

It is preferable that the display determining unit 13 sets the "predetermined position ahead of the user's vehicle" on the basis of, for example, the position of the user's vehicle which is used for the estimation of the relative distance, and a predetermined distance.

FIG. 6C shows an example in which a stereoscopic display object 105*c* is displayed at a predetermined position ahead of the user's vehicle 100. The stereoscopic display object 105*c* is displayed at a position closer to the user's vehicle 100 than the stereoscopic display object 105*a* shown in FIG. 6A and the stereoscopic display object 105*b* shown in FIG. 6B.

The display position of the stereoscopic display object 105*c* shown in FIG. 6C corresponds to a "first position."

On the other hand, when the amount of change in the relative distance between the display obstacle and the user's vehicle is greater than the second threshold value ("NO" in step ST105), the display determining unit 13 sets the display object which the HUD 1 displays to be a planar image and sets the display mode in such a way that the display object is displayed at a predetermined position ahead of the driver (step ST108). This is because, when the amount of change in the relative distance is further large, more specifically, for example, when a preceding vehicle which is a display obstacle slows down suddenly, there is a possibility that sufficient space which makes it possible to display a stereoscopic image therein cannot be ensured between the display obstacle and the user's vehicle.

It is preferable that the display determining unit 13 sets the "predetermined position ahead of the driver" on the basis of, for example, the position of the user's vehicle which is used for the estimation of the relative distance, the position of the driver which is analyzed by the information analyzing unit 12, and a predetermined distance.

FIG. 6D shows an example in which a planar display object 105*d* is displayed at the predetermined position ahead of the driver of the user's vehicle 100. In a general HUD 1, the planar display object 105*d* is displayed at a position about a few meters ahead of the driver, so that the planar display object does not overlap any display obstacle and does not penetrate any display obstacle.

The display position of the planar display object 105*d* shown in FIG. 6D corresponds to a "position closer to the moving object than the first position."

The display determining unit 13 instructs the display instructing unit 14 about the information of the display mode which is set in either of the steps ST106, ST107 and ST108.

The display instructing unit 14 outputs an instruction to display the display object to the HUD 1 on the basis of the display mode instructed by the display determining unit 13 (step ST109). The HUD 1 displays the display object, as a stereoscopic image or a planar image, at the instructed display position in accordance with the instruction from the display instructing unit 14.

The information acquiring unit 11 waits until a predetermined time (e.g., 1 second) elapses since the time when the information acquiring unit 11 acquired the information in previous step ST101 (step ST110), and, after that, returns to step ST101 and acquires new information. Namely, in the flow chart of FIG. 4, whether or not the display mode of the display object is to be changed is determined on the basis of the amount of change per second in the relative distance between the display obstacle and the user's vehicle.

When it is determined for the first time that the display obstacle exists between the display object and the user's vehicle, or when it is determined for the first time that the display obstacle exists within the display mode change distance ("YES" in step ST103), no previous relative distance between the display obstacle and the user's vehicle is stored.

Therefore, after storing a first-time relative distance, the display determining unit 13 skips the steps ST104 to ST109 and advances to the process of step ST110.

Further, when it is determined for the first time that the display obstacle does not exist between the display object and the user's vehicle, or when it is determined for the first time that the display obstacle does not exist within the display mode change distance ("NO" in step ST103), the display determining unit 13 which received this determination result outputs an instruction to return the display mode of the display object to the initial display mode to the display instructing unit 14, and the display instructing unit 14 outputs an instruction to the HUD 1 to display the display object on the basis of the initial display mode instructed by the display determining unit 13 (step ST111).

Next, the processing explained using the flow chart of FIG. 4 will be explained hereafter with reference to a specific example. Hereafter, it is assumed that the display control device 10 instructs the HUD 1 to superimpose a stereoscopic display object showing a guide arrow on the road at the initial display position 10 meters ahead of the user's vehicle.

At this time, it is assumed that the information analyzing unit 12 recognizes a preceding vehicle which is a display obstacle at a position 8 m ahead of the user's vehicle, and determines that the display obstacle exists within the display mode change distance ("YES" in step ST103).

The display determining unit 13 receives the relative distance and the determination result from the information analyzing unit 12, calculates the amount of change between the previous relative distance and the current relative distance, determines that the amount of change in the relative distance is greater than the first threshold value ("NO" in step ST104) and is equal to or smaller than the second threshold value ("YES" in step ST105), and sets the display mode in such a way that a stereoscopic image showing the guide arrow is displayed at a position 3 meters ahead of the user's vehicle (step ST107).

On the basis of the display mode set by the display determining unit 13, the display instructing unit 14 instructs the HUD 1 to change the position at which the guide arrow is displayed as a stereoscopic image from the position 10 meters ahead of the user's vehicle to the position 3 meters ahead of the user's vehicle (step ST109).

It is assumed that, after that, the sequence returns to step ST101 and the processes of up to step ST103 are performed, and, the information analyzing unit 12, in current step ST103, determined that the above-mentioned preceding vehicle approached the user's vehicle ("YES" in step ST103). The display determining unit 13 receives the relative distance and the determination result from the information analyzing unit 12, and calculates the amount of change between the previous relative distance and the current relative distance (step ST104).

When the amount of change in the relative distance between the preceding vehicle and the user's vehicle is greater than the first threshold value ("NO" in step ST104) and is greater than the second threshold value ("NO" in step ST105), the display determining unit 13 sets the display mode in such a way that a planar image showing a guide arrow is displayed at a position 3 meters ahead of the driver of the user's vehicle (step ST108). The display instructing unit 14 changes the guide arrow from a stereoscopic image to a planar image on the basis of the display mode set by the display determining unit 13, and instructs the HUD 1 to change the position at which this planar image is displayed from the position 3 meters ahead of the user's vehicle to the position 3 meters ahead of the driver (step ST109).

When the amount of change in the relative distance between the preceding vehicle and the user's vehicle is equal to or smaller than the first threshold value ("YES" in step ST104), the display determining unit 13 sets the display mode in such a way that the stereoscopic image showing the guide arrow is displayed at a position 3 meters behind the above-mentioned preceding vehicle (step ST106). On the basis of the display mode set by the display determining unit 13, the display instructing unit 14 instructs the HUD 1 to change the position at which the stereoscopic image showing the guide arrow is displayed to the position 3 meters behind the preceding vehicle (step ST109).

Further, when the above-mentioned preceding vehicle got away from the display mode change distance ("NO" in step ST103), the display determining unit 13 outputs an instruction to return the display mode of the guide arrow to the display instructing unit 14 (step ST111). The display instructing unit 14 instructs the HUD 1 to display the guide arrow, as a stereoscopic image, at the position 10 meters ahead of the user's vehicle, the position being the initial display position.

In the above, the display mode changing method which is used when the user's vehicle and the display obstacle approach each other is explained. On the contrary, when the user's vehicle and the display obstacle go away from each other, the display mode may be changed in the following way.

For example, for the amount of change in the relative distance, a third threshold value and a fourth threshold value smaller than the third threshold value are predetermined. While a display object is displayed, as a stereoscopic image, at a predetermined position ahead of the user's vehicle, when the amount of change in the relative distance between the user's vehicle and the display obstacle is greater than the third threshold value, and there is sufficient display space ahead of the user's vehicle, the display determining unit 13 sets the display object which the HUD 1 displays to be a stereoscopic image, and sets the display mode in such a way that the display object is displayed at a predetermined position on the near side of the display obstacle.

Further, while a display object is displayed as a planar image at a predetermined position ahead of the driver, when the amount of change in the relative distance between the user's vehicle and the display obstacle is equal to or smaller than the third threshold value and is greater than the fourth threshold value, and there is sufficient display space ahead of the user's vehicle, the display determining unit 13 sets the display object which the HUD 1 displays to be a stereoscopic image, and sets the display mode in such a way that the display object is displayed at a predetermined position ahead of the user's vehicle.

Alternatively, the display determining unit 13 may determine the necessity to change the display mode by using only one of the third and fourth threshold values.

Figure 8:
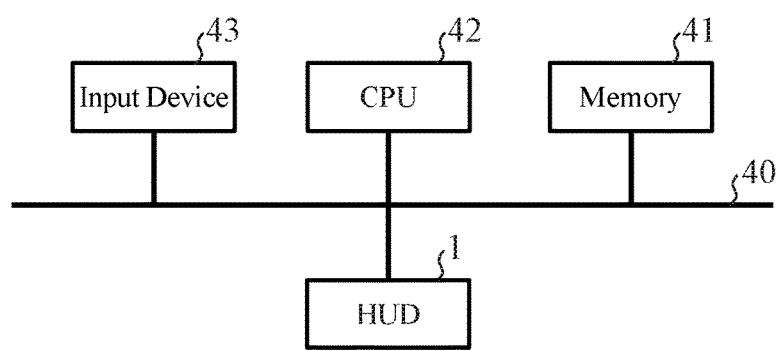
FIG. 8 is a hardware block diagram of the display system according to Embodiment 1.

Next, an example of a hardware configuration of the display control device 10 will be explained with reference to FIG. 8. A memory 41, a CPU (Central Processing Unit) 42, an input device 43 and an HUD 1 are connected to a bus 40.

Information outputted by peripheral devices mounted in the vehicle, such as the car external camera 3, is inputted to the input device 43. The input device 43 is the information acquiring unit 11.

The CPU 42 implements the functions of the information analyzing unit 12, the display determining unit 13 and the display instructing unit 14 by executing a display control program stored in the memory 41.

Information which the CPU 42 outputs is inputted to the HUD 1, and the HUD 1 presents a display object to the driver by displaying and outputting the display object in accordance with the information.

As described above, according to Embodiment 1, the display system has a configuration including: an HUD 1 that can superimpose a display object, as a stereoscopic image, on an actual scene; and a display control device 10 that controls this HUD 1. The display control device 10 is configured to include: the information acquiring unit 11 that acquires information about a vehicle and information about surroundings; the information analyzing unit 12 that estimates a relative distance between a display obstacle and the vehicle by using information acquired by the information acquiring unit 11, and determines whether the display obstacle exists between a display object which is superimposed on an actual scene, and the vehicle; the display determining unit 13 that changes the display mode of the display object in accordance with an amount of change in the relative distance when the information analyzing unit 12 determines that a display obstacle exists between the display object and the vehicle; and the display instructing unit 14 that instructs the HUD 1 to display the display object in the display mode changed by the display determining unit 13. As a result, in the HUD 1 which can display a three-dimensional stereoscopic image, a phenomenon in which the display object is displayed as if it penetrates a display obstacle can be prevented, and therefore, the visibility can be improved.

Alternatively, it is also preferable for the information analyzing unit 12 to determine whether there exists a display obstacle having a possibility to come to a position between a display object, which is superimposed on an actual scene, and the vehicle. As a result, a penetration phenomenon can be prevented more certainly.

Further, according to Embodiment 1, the display determining unit 13 is configured to compare the amount of change in the relative distance with the first threshold value, and, when the amount of change in the relative distance is greater than the first threshold value, determine to display the display object, as a stereoscopic image, at a predetermined first position ahead of the vehicle. As a result, even when the relative distance decreases largely, a phenomenon in which a display object is displayed as if it penetrates the display obstacle can be prevented.

Further, according to Embodiment 1, the display determining unit 13 is configured to compare the amount of change in the relative distance with the second threshold value greater than the first threshold value, and, when the amount of change in the relative distance is greater than the second threshold value, determine to display the display object, as a planar image, at a position closer to the vehicle than the first position. Therefore, a phenomenon in which the display object is displayed as if it penetrates the display obstacle can be prevented even when the relative distance decreases rapidly.

Further, according to Embodiment 1, the display determining unit 13 is configured to return the display mode of the display object when the relative distance is equal to or greater than a predetermined distance (e.g., a display mode change distance). As a result, when the display mode is not required to be changed, the display object is displayed in an original display mode so that the visibility can be improved.

Embodiment 2

Figure 9:
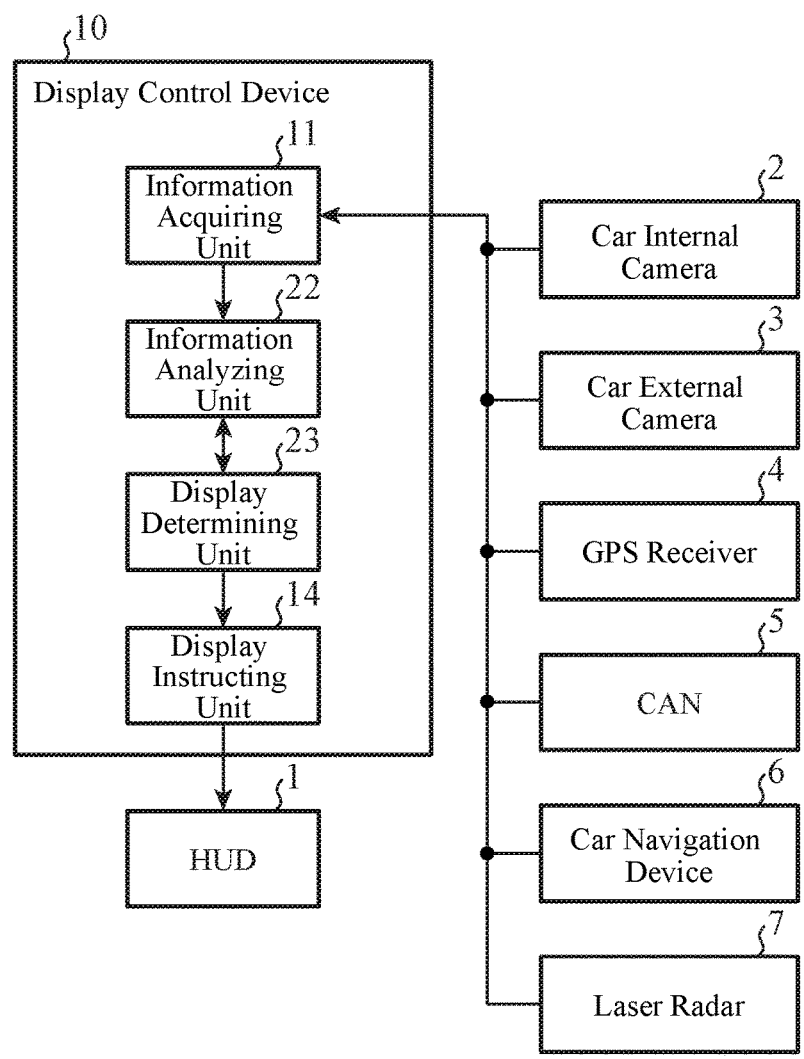
FIG. 9 is a block diagram showing an example of a configuration of a display system according to Embodiment 2 of the present invention.

FIG. 9 is a block diagram showing an example of a configuration of a display control device 10 according to Embodiment 2 of the present invention. In FIG. 9, the same or corresponding components as those of FIG. 1 are denoted by the same reference numerals, and the explanation of those components will be omitted hereafter. An information analyzing unit 22 and a display determining unit 23 of the display control device 10 according to Embodiment 2 differ from the information analyzing unit 12 and the display determining unit 13 of the display control device 10 according to Embodiment 1, which are shown in FIG. 1, in that new functions are added to them.

In Embodiment 2, when the display mode of a display object is set to a planar image, not only an amount of change in the relative distance between a display obstacle and a user's vehicle, but also the value of the relative distance itself is taken into consideration.

Figure 10A:
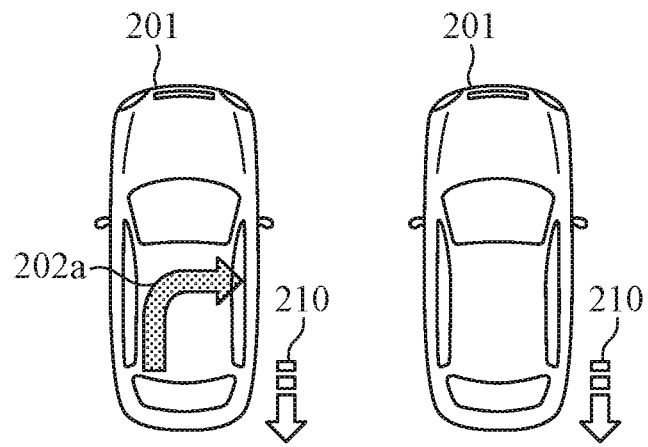
FIGS. 10A and 10B are diagrams showing an example in which a display mode of a display object is changed in Embodiment 2.
Figure 10B:
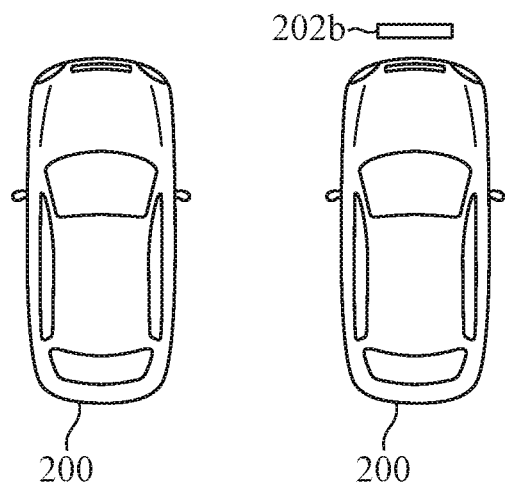

In FIGS. 10A and 10B, an example of changing the display mode of a display object according to Embodiment 2 is shown. As shown in FIG. 10A, when an amount of change 210 in the relative distance between a preceding vehicle 201 which is a display obstacle and the user's vehicle 200 is greater than a first threshold value and is equal to or smaller than a second threshold value, a stereoscopic display object 202a which is a guide arrow is displayed, as a stereoscopic image, ahead of the user's vehicle. When the relative distance decreases slowly and as a result a space for displaying a stereoscopic image between a preceding vehicle and the user's vehicle disappears, for example, when the vehicle stops at a traffic signal indicating a red light or encounters a traffic jam, there is a possibility that the stereoscopic display object 202a penetrates the preceding vehicle 201, as shown in FIG. 10A, if the display mode is set dependently only on the relative distance change amount 210. Thus, as shown in FIG. 10B, when the relative distance between the preceding vehicle 201 and the user's vehicle 200 is small, by changing the display mode of the guide arrow from the stereoscopic display object 202a to planar display object 202b, a phenomenon in which the display object is displayed as if it penetrates the display obstacle can be prevented.

The information analyzing unit 22 performs the same processing as that performed by the information analyzing unit 12 according to the aforementioned Embodiment 1. In addition, the information analyzing unit 22 compares the relative distance received from the information acquiring unit 11 with a predetermined relative distance threshold value, and outputs a result of determination of whether or not the relative distance is less than the relative distance threshold value to the display determining unit 23. It is desirable that the relative distance threshold value is a distance set to prevent a display object from penetrating the display obstacle when the display object is displayed ahead of the user's vehicle as a stereoscopic image. Further, because a display object differs in its display size dependently on the type of the display object, it is also preferable to define different relative distance threshold values for the respective display object types.

The display determining unit 23 receives the information about the result of the determination of whether or not the relative distance is less than the relative distance threshold value from the information analyzing unit 22, in addition to information about the display object to be displayed on the HUD 1, the relative distance between the display obstacle and the user's vehicle, and a result of determination of whether the display obstacle exists between the display object and the user's vehicle, and so on. When the information analyzing unit 22 determines that the relative distance between the display obstacle and the user's vehicle is less than the relative distance threshold value, the display determining unit 23 sets the display object which the HUD 1 displays to be a planar image, and sets the display mode in such a way that the display object is displayed at a predetermined position ahead of the driver. On the other hand, when the relative distance between the display obstacle and the user's vehicle is determined to be equal to or greater than the relative distance threshold value, the display determining unit 23 sets the display mode in accordance with the relative distance, similarly to the aforementioned Embodiment 1.

Next, the operation of the display control device 10 according to Embodiment 2 will be explained using a flow chart shown in FIG. 11. Because steps ST101 to ST111 shown in FIG. 11 are the same as those of the flowchart of Embodiment 1 shown in FIG. 4, the explanation of the steps will be omitted hereafter.

The information analyzing unit 22 analyzes vehicle information and surroundings information in step ST102, and when a display obstacle is recognized ahead of the user's vehicle, estimates the relative distance between this display obstacle and the user's vehicle and determines whether or not the relative distance is less than the relative distance threshold value in step ST201. When the relative distance is less than the relative distance threshold value ("YES" in step ST201), the display determining unit 23 sets the display object which the HUD 1 displays to be a planar image, and sets the display mode in such a way that the display object is displayed at a predetermined position ahead of the driver (step ST108).

On the other hand, when the relative distance is equal to or greater than the relative distance threshold value ("NO" in step ST201), the information analyzing unit 22 determines whether the display obstacle exists between the display object and the user's vehicle, or whether the display obstacle exists within a display mode change distance (step ST103). Also when no display obstacle is able to be recognized ahead of the user's vehicle, the information analyzing unit 22 determines that the relative distance is equal to or greater than the relative distance threshold value.

Because processes of step ST103 and subsequent steps are the same as those according to above-mentioned Embodiment 1, the explanation of the processes will be omitted hereafter.

In the flow chart shown in FIG. 11, after the process of step ST201 is performed, the process of step ST103 is performed. As an alternative, the process of step ST103 may be performed before the process of step ST201.

The processing explained using the flow chart of FIG. 11 will be explained below with reference to a specific example. Hereafter, it is assumed that the display determining unit 23 determines that the amount of change in the relative distance between a preceding vehicle which is a display obstacle and the user's vehicle is greater than the first threshold value ("NO" in step ST104), and is equal to or smaller than the second threshold value ("YES" in step ST105), and sets the display mode in such a way that a stereoscopic image showing a guide arrow is displayed at a position 3 meters ahead of the user's vehicle (step ST107), and the HUD 1 displays the display object in accordance with the setting.

After that, the sequence return to step ST101, the processes of up to step ST201 are performed, and it is assumed that, in current step ST201, the information analyzing unit 22 determines that the above-mentioned preceding vehicle approaches a position 3 meters ahead of the user's vehicle, and the relative distance of 3 meters is less than the predetermined relative distance threshold value of 4 meters ("YES" in step ST201).

The display determining unit 23 which received this determination result sets the display mode in such a way that a planar image showing the guide arrow is displayed at a position 3 meters ahead of the driver of the user's vehicle, regardless of the amount of change in the relative distance between the user's vehicle and the preceding vehicle (step ST108).

On the basis of the display mode set by the display determining unit 23, the display instructing unit 14 changes the guide arrow from the stereoscopic image to the planar image, and instructs the HUD 1 to change the position at which this planar image is displayed from the position 3 meters ahead of the user's vehicle to the position 3 meters ahead of the driver (step ST109).

As described above, according to Embodiment 2, the information analyzing unit 22 is configured to determine whether or not the relative distance is less than the relative distance threshold value, and the display determining unit 23 is configured to, when the information analyzing unit 22 determines that the relative distance is less than the relative distance threshold value, determine to display a display object, as a planar image, at a position closer to the user's vehicle than a first position, regardless of the amount of change in the relative distance. As a result, in consideration of the relative distance between the display obstacle and the user's vehicle, when there is no space for displaying a stereoscopic image, it is possible to display a planar image. Consequently, a phenomenon in which a display object is displayed as if it penetrates the display obstacle can be prevented more certainly, and an improvement in the visibility can be achieved.

Embodiment 3

Figure 12:
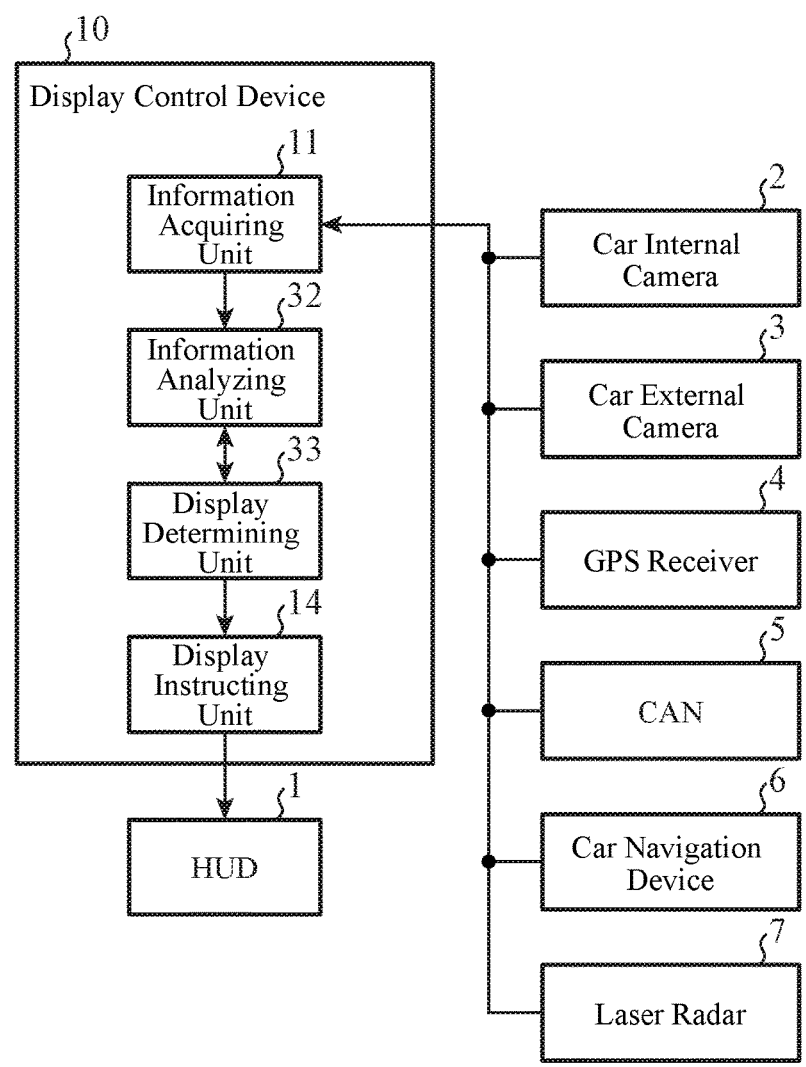
FIG. 12 is a block diagram showing an example of a configuration of a display system according to Embodiment 3 of the present invention.

FIG. 12 is a block diagram showing an example of a configuration of a display control device 10 according to Embodiment 3 of the present invention. In FIG. 12, the same or corresponding components as those of FIG. 1 are denoted by the same reference numerals, and the explanation of those components will be omitted hereafter. An information analyzing unit 32 and a display determining unit 33 of the display control device 10 according to Embodiment 3 differ from the information analyzing unit 12 and the display determining unit 13 of the display control device 10 according to Embodiment 1, which are shown in FIG. 1, in that new functions are added to them.

In Embodiment 3, by not only preventing a phenomenon in which a display object is displayed as if it penetrates a display obstacle, but also displaying the display object in a display mode in accordance with the type of the display obstacle, the driver of a vehicle is enabled to grasp information about the display object more intuitively.

Figure 13:
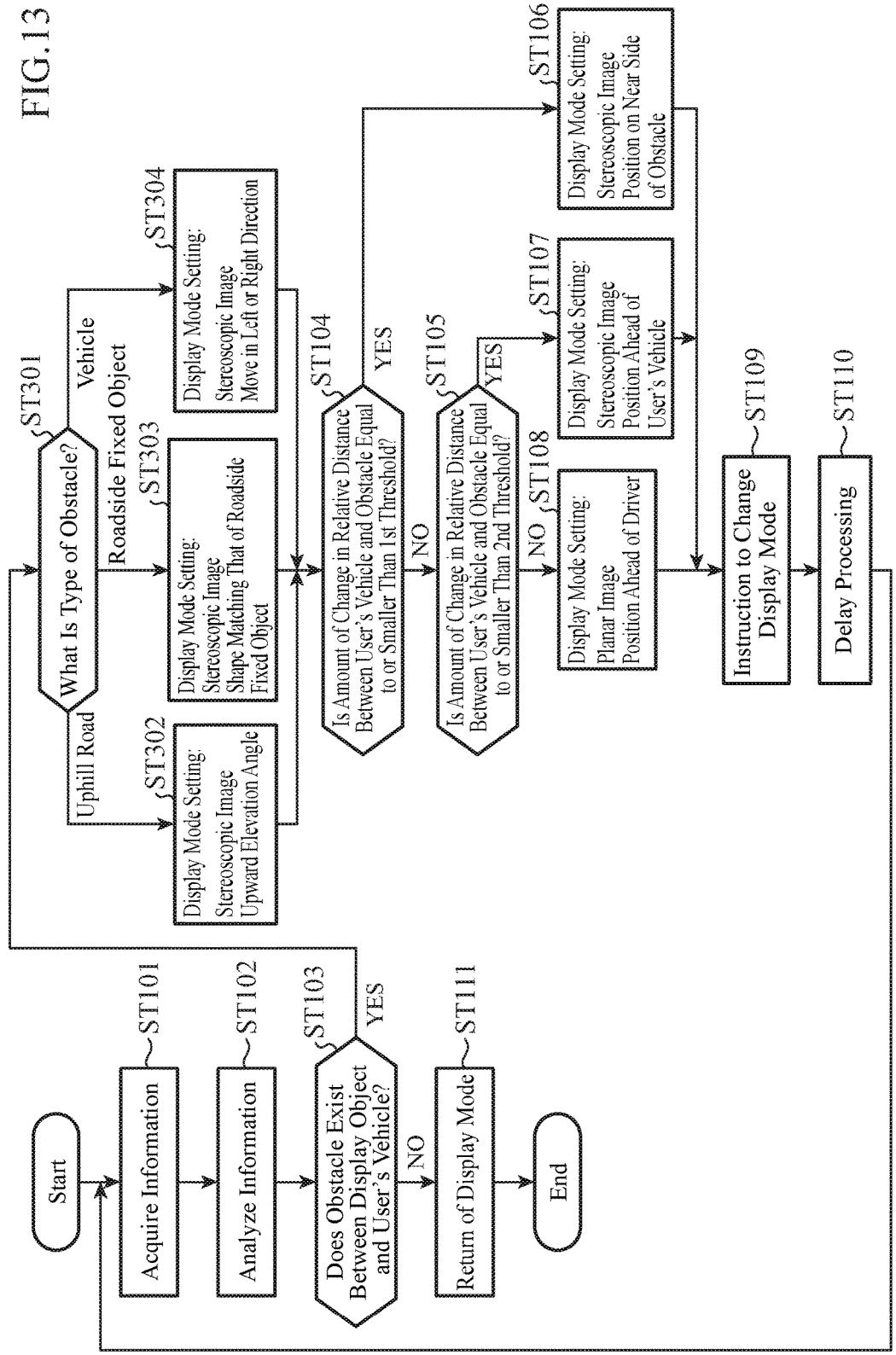
FIG. 13 is a flow chart showing an operation of a display control device according to Embodiment 3.

Next, the operation of the display control device 10 according to Embodiment 3 will be explained using a flow chart shown in FIG. 13. Because steps ST101 to ST111 shown in FIG. 13 are the same as those of the flowchart of Embodiment 1 shown in FIG. 4, the explanation of the steps will be omitted hereafter.

The information analyzing unit 32 analyzes surroundings information received from an information acquiring unit 11, determines the type, the shape and so on of a display obstacle, and outputs information about the type, the shape and so on to the display determining unit 33 (step ST301). The display determining unit 33 changes the display mode of a display object in accordance with the information about the type, the shape and soon of the display obstacle received from the information analyzing unit 32 (steps ST302 to ST304).

Hereafter, the following three types are explained as examples of a display obstacle: an uphill road, a roadside fixed object such as a guardrail, and a vehicle.

The information analyzing unit 32 determines the shape of the display obstacle on the basis of a captured image from the car external camera 3, map information from the car navigation device 6, three dimensional information from the laser radar 7, or the like. Further, when the type of the display obstacle is the vehicle, the information analyzing unit 32 determines the position of the vehicle which is a display obstacle, on the basis of the captured image from the car external camera 3, the three dimensional information from the laser radar 7, or the like. Moreover, when the type of the display obstacle is the vehicle, on the basis of the navigation information from the car navigation device 6, the information analyzing unit 32 determines information about the traveling direction of the user's vehicle, such as information showing that the user's vehicle should make a right turn at the next guide point.

When the type of the display obstacle is the uphill road (when "uphill road" in step ST301), the display determining unit 33 sets the display object which the HUD 1 displays to be a stereoscopic image, and further sets the display mode in such a way that the angle of elevation of the display object is increased and the display object is directed upward (step ST302).

Figure 14A:
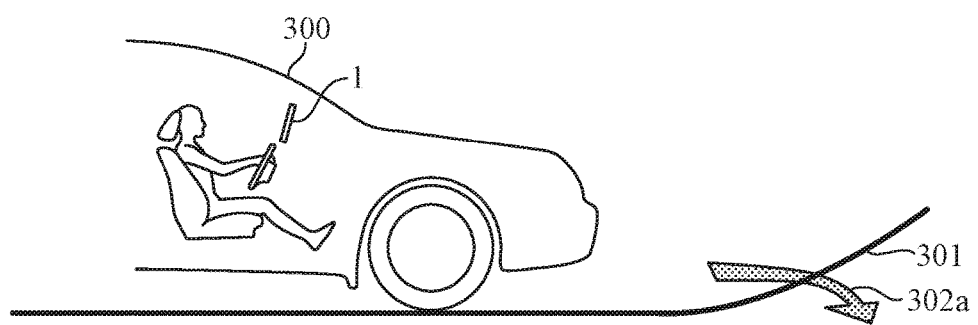
FIGS. 14A and 14B are diagrams showing an example of changing a display mode of a display object when the type of a display obstacle is an uphill road in Embodiment 3.
Figure 14B:
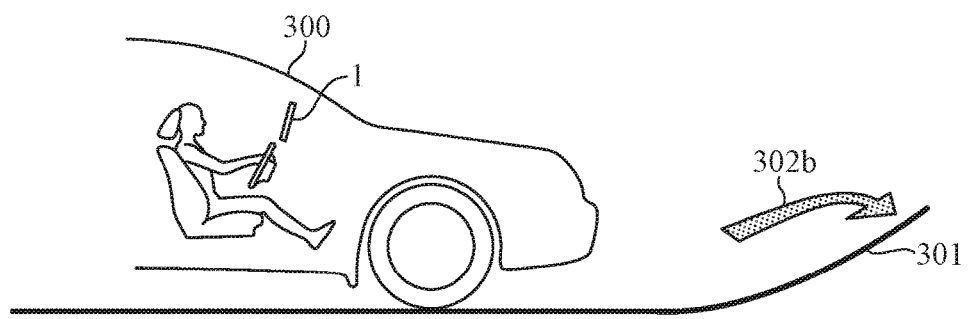

In FIGS. 14A and 14B, an example of changing the display mode of a display object when the type of the display obstacle is the uphill road is shown. When there is an uphill road 301 ahead of the user's vehicle 300, if a planar display object 302*a*, such as a guide arrow, is displayed at a predetermined position ahead of the user's vehicle 300, there is a possibility that the planar display object penetrates the uphill road 301, as shown in FIG. 14A. Thus, by displaying the guide arrow as a stereoscopic display object 302*b*, and further changing the angle of elevation of the stereoscopic display object 302*b* to the upward direction, the penetration can be prevented, as shown in FIG. 14B. Further, because the stereoscopic display object 302*b* is displayed in a display shape formed along the uphill road 301, the driver can intuitively grasp the content of route guidance showing that the user's vehicle will go up the uphill road 301.

Further, it is preferable for the display determining unit 33 to increase the elevation angle of the stereoscopic display object 302*b* as the amount of change in the relative distance between the user's vehicle 300 and the uphill road 301 becomes large, that is, as the speed of the user's vehicle approaching the uphill road 301 becomes high. As a result, the phenomenon in which the stereoscopic display object 302*b* is displayed as if it penetrates the uphill road 301 can be prevented more certainly.

When the type of the display obstacle is the roadside fixed object (when "roadside fixed object" in step ST301), the display determining unit 33 sets the display object which the HUD 1 displays to be a stereoscopic image, and further sets the display shape of the display object to be a shape formed along a roadside fixed object (step ST303).

Figures 15A, 15B, 15C:
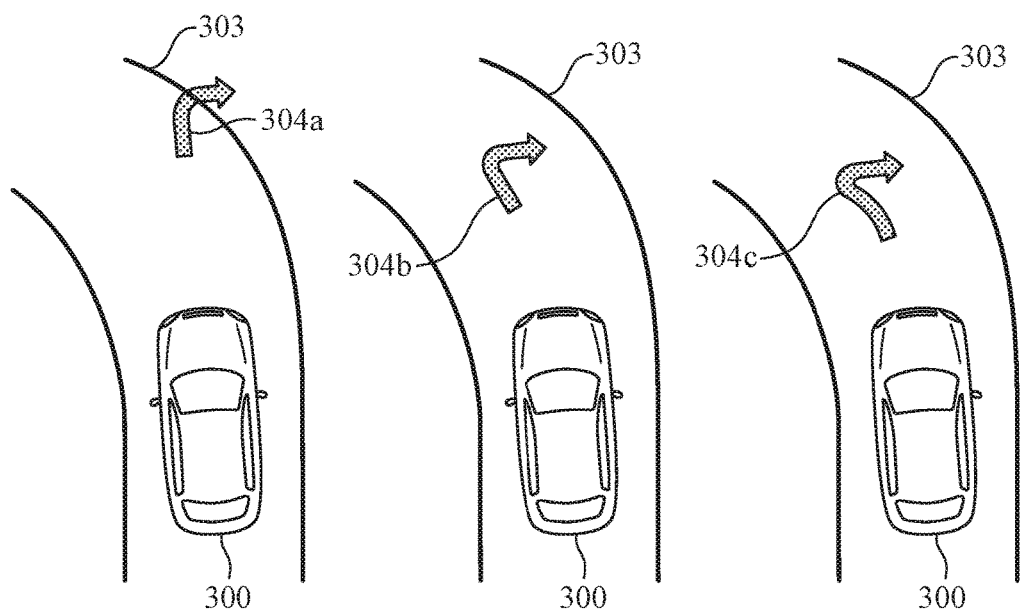
FIGS. 15A to 15C are diagrams showing an example of changing a display mode of a display object when the type of a display obstacle is a roadside fixed object in Embodiment 3.

In FIGS. 15A to 15C, an example of changing the display mode of the display object when the type of the display obstacle is the roadside fixed object is shown. When there exists a roadside fixed object 303, such as a guardrail, ahead of the user's vehicle 300, there is a possibility that if a stereoscopic display object 304*a*, such as a guide arrow, is displayed at a predetermined position ahead of the user's vehicle 300 in an initial display mode, the stereoscopic display object penetrates the roadside fixed object 303, as shown in FIG. 15A. Thus, by changing the display position of the guide arrow, and by changing the display shape of the guide arrow to be the display mode such as the stereoscopic display object 304*b* or 304*c* as shown in FIG. 15B or FIG. 15C, the penetration can be prevented. Further, because the stereoscopic display object 304*b* or 304*c* is displayed in a display shape formed along the roadside fixed object 303, the driver can intuitively grasp the traveling direction.

When the type of the display obstacle is the vehicle (when "vehicle" in step ST301), the display determining unit 33 sets the display object which the HUD 1 displays to be a stereoscopic image, and further sets the display mode in such a way that the display position of the display object is moved to right or left (step ST304). At this time, the display determining unit 33 may determine the moving direction of the display position, which is either one of right or left, on the basis of the content of the display object.

Figure 16A:
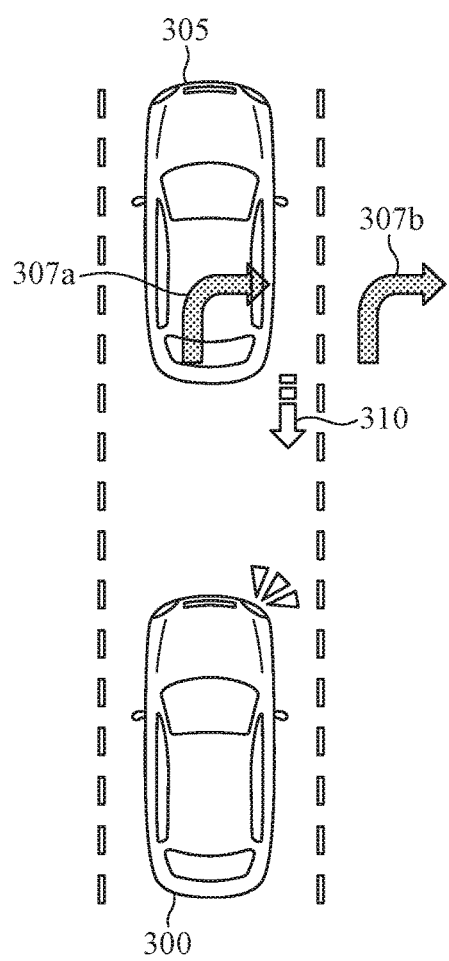
FIGS. 16A and 16B are diagrams showing an example of changing a display mode of a display object when the type of a display obstacle is a vehicle in Embodiment 3.
Figure 16B:
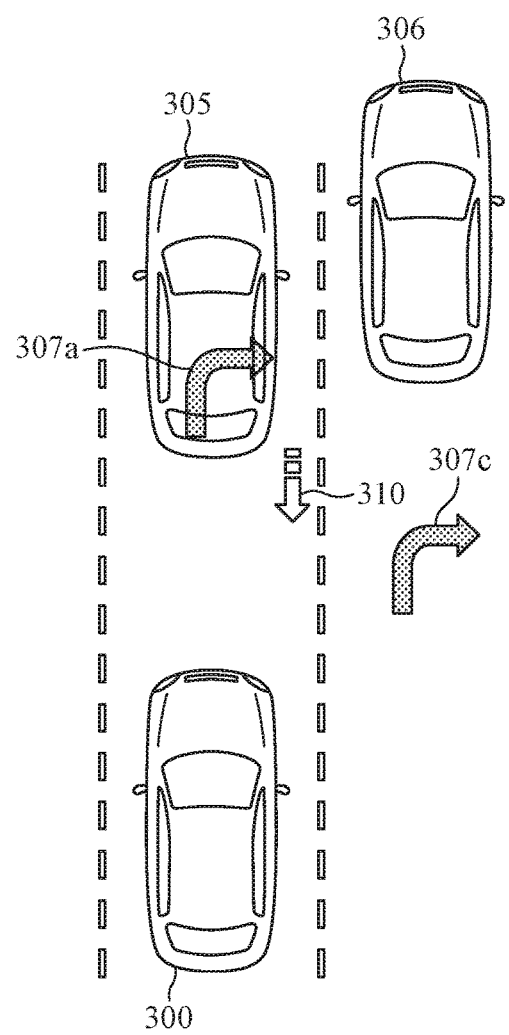

In FIGS. 16A and 16B, an example of changing the display mode of the display object when the type of the display obstacle is the vehicle is shown.

For example, when the display object is a stereoscopic display object 307a which is a right turn guide arrow showing that the user's vehicle should make a right turn at the next guide point, this stereoscopic display object 307a is displayed on the lane along which the user's vehicle 300 is traveling, and ahead of the user's vehicle 300 under normal circumstances. However, as shown in FIG. 16A, when a preceding vehicle 305 which is a display obstacle exists on the lane along which the user's vehicle 300 is traveling and ahead of the user's vehicle 300, there is a possibility that the stereoscopic display object 307a is superimposed on the preceding vehicle 305 as if it penetrates the preceding vehicle. Thus, the display determining unit 33 moves the display position of the stereoscopic display object 307a to a position on an adjacent lane on the right, and displays the display object as a stereoscopic display object 307b. As a result, the driver of the user's vehicle 300 can visually recognize the guide arrow on the right-hand side of the original display position, and can intuitively grasp the traveling direction.

It is also preferable that the display determining unit 33 determines the movement direction of the display position on the basis of the content of the display object, for example, the display determining unit 33 moves a right turn guide arrow in the right direction, or moves a left turn guide arrow in the left direction.

Further, when not only a preceding vehicle 305 exists on the lane along which the user's vehicle 300 is traveling, but also another preceding vehicle 306 exists on an adjacent lane, as shown in FIG. 16B, the display determining unit 33 may set a direction in which there is a space where the stereoscopic display object 307a can be displayed ahead of the user's vehicle 300 as the destination of the movement of the display position, and display the display object as a stereoscopic display object 307c.

When there is no space in which the stereoscopic display object 307a can be displayed ahead of the user's vehicle 300, the display determining unit 33 may not have to move the stereoscopic display object 307a. In this case, the display position of the stereoscopic display object 307a is changed in the direction parallel to the traveling lane in accordance with the amount of change in the relative distance between the user's vehicle 300 and the preceding vehicle 305.

In addition, the display determining unit 33 may increase the moving distance of the stereoscopic display object 307b or 307c in the right or left direction as the amount of change in the relative distance between the user's vehicle 300 and the preceding vehicle 305 or 306 becomes large, that is, as the speed at which the user's vehicle approaches the preceding vehicle 305 or 306 becomes high. In FIGS. 16A and 16B, the amount of change in the relative distance between the preceding vehicle 305 and the user's vehicle 300 is represented by the arrow showing a relative distance change amount 310.

Further, when the type of the display obstacle is the vehicle, the display determining unit 33 may receive lane information about the road, which the information analyzing unit 32 acquires by analyzing the captured image from the car external camera 3 or the map information from the car navigation device 6, and change the display position of the display object to a position in either the right or the left direction on the basis of the lane information. The lane information includes information about the number of lanes of the road along which the user's vehicle is traveling, and the position of the lane along which the user's vehicle is traveling, and may further include information for identifying a right-turn-only or left-turn-only lane or the like.

For example, when the road along which the user's vehicle is traveling is divided into a plurality of lanes around an intersection, and the user's vehicle is going to make a right turn at this intersection, the user's vehicle needs to move to aright side lane or a right-turn-only lane to make aright turn. At this time, by moving the display position of the display object to a right side lane or a right-turn-only lane, the display determining unit 33 prevents a phenomenon in which the display object is displayed as if it penetrates a preceding vehicle, and enables the driver to intuitively grasp the traveling direction.

Because processes of step ST104 and subsequent steps are the same as those according to above-mentioned Embodiment 1, the explanation of the processes will be omitted hereafter.

Although the explanation will be omitted, when plural types of display obstacles exist ahead of the user's vehicle 300, the display determining unit 33 may combine the display modes shown in steps ST302 to ST304.

Further, when penetration of a display object through a display obstacle does not occur as a result of, in steps ST302 to ST304, changing the display mode of the display object in accordance with the type of the display obstacle, the display determining unit 33 may skip the processes (steps ST104 to ST108) of changing the display mode in consideration of the amount of change in the relative distance between the display obstacle and the user's vehicle, and advance to the process of step ST109.

For example, after the processes of steps ST302 to ST304, the information analyzing unit 32 compares the display position of the display object after the display mode change with the position of the display obstacle, and, when the display obstacle does not exist between the user's vehicle and the display object, determines that no penetration occurs and advances to the process of step ST109. In contrast, when a display obstacle exists between the user's vehicle and the display object, the information analyzing unit 32 determines that penetration occurs and advances to the process of step ST104.

Further, in the flow chart shown in FIG. 13, the processes of changing the display mode in accordance with the type of the display obstacle (steps ST301 to ST304) are performed previously, and, after that, the processes of changing the display mode in accordance with the amount of change in the relative distance between the display obstacle and the user's vehicle (steps ST104 to ST108) are performed. As an alternative, the processes of steps ST104 to ST108 may be performed previously.

As described above, according to Embodiment 3, because the information analyzing unit 32 is configured to determine the type of a display obstacle, and the display determining unit 33 is configured to change the display mode of a display object at a time when the display object is displayed as a stereoscopic image, in accordance with the type of the display obstacle, the occurrence of the phenomenon in which the display object is displayed as if it penetrates the display obstacle can be prevented. Further, the driver is enabled to intuitively grasp the description of the display object.

Further, according to Embodiment 3, because the display determining unit 33 is configured to, when the type of a display obstacle is the uphill road, set the angle of elevation of the display object which is displayed as a stereoscopic image to an upward angle, the occurrence of the phenomenon in which the display object is displayed as if it penetrates the uphill road can be prevented. Further, the driver is enabled to intuitively grasp that the user's vehicle will go up the uphill road.

Further, according to Embodiment 3, because the display determining unit 33 is configured to, when the type of a display obstacle is the roadside fixed object, change the shape of the display object which is displayed as a stereoscopic image to match the shape of the roadside fixed object, the occurrence of a phenomenon in which the display object is displayed as if it penetrates the uphill road can be prevented. Further, the driver is enabled to intuitively grasp the traveling direction of the user's vehicle.

Further, according to Embodiment 3, because the display determining unit 33 is configured to, when the type of a display obstacle is the vehicle, set the position of the display object which is displayed as a stereoscopic image to a position being right or left of the user's vehicle, the display object can be displayed at the position in the right or left without penetrating the display obstacle even when there is no space in which the display object is displayed as a stereoscopic image ahead of the user's vehicle.

Further, according to Embodiment 3, because the display determining unit 33 is configured to determine to which one of the position to the right and the position to the left the position of the display object which is displayed as a stereoscopic image is changed on the basis of lane information about the road along which the user's vehicle is traveling, the display object can be displayed with moving its position in the same direction as the proceeding direction of the user's vehicle, and the driver is enabled to intuitively grasp the traveling direction of the user's vehicle.

In each of the embodiments of the present invention, an example in which the display system provided with an HUD 1 and a display control device 10 is mounted in a vehicle is explained. However, the present invention is not limited to the vehicle, and the display system may be mounted in a moving object such as a person, a railway car, a ship, or an airplane. Further, the display control device 10 may be an apparatus mounted in a moving object, or a mobile information terminal carried into a moving object. The display device is not limited to the HUD 1. For example, the display device may be a display, such as an HMD (Head Mounted Display) that can display a stereoscopic image and a planar image. In addition, as a peripheral device such as the car internal camera 2, a device installed in a moving object may be used, or a device installed in the display control device 10, the HUD 1 or the HMD may be used.

While the present invention has been described above, in addition to the above explanation, any combination of two or more of the above-described embodiments can be made, various changes can be made in any component of embodiments, and any component of embodiments can be omitted, within the scope of the invention.

INDUSTRIAL APPLICABILITY

Because the display control device according to the present invention prevents a phenomenon in which a display object is displayed as if it penetrates a display obstacle, the present invention is suitable for a display control device that controls a display device, such as an HUD or an HMD, that can display a stereoscopic image.

REFERENCE SIGNS LIST

1 HUD (display device), 2 car internal camera, 3 car external camera, 4 GPS receiver, 5 CAN, 6 car navigation device, laser radar, 10 display control device, 11 information acquiring unit, 12, 22, 32 information analyzing unit, 13, 23, 33 display determining unit, 14 display instructing unit, 40 bus, 41 memory, 42 CPU, 43 input device, 100, 200, 300 user's vehicle, 101, 101*a*, 101*b*, 101*c*, 201, 305, 306 preceding vehicle, 102*a*, 104*a*, 105*d*, 202*b*, 302*a* planar display object, 102*b*, 104*b*, 105, 105*a* to 105*c*, 202*a*, 302*b*, 304*a* to 304*c*, 307*a* to 307*c* stereoscopic display object, 103 road, 110 to 112, 210, 310 amount of change in relative distance, 301 uphill road, and 303 roadside fixed object.

The invention claimed is:

1. A display control device that controls a display device that can superimpose a display object, as a stereoscopic image, on an actual scene, the display control device comprising:
    an information acquirer acquiring information about a moving object and information about surroundings;
    an information analyzer estimating a relative distance between a display obstacle and the moving object by using the information acquired by the information acquirer, and determining whether the display obstacle exists between the display object which is superimposed on an actual scene, and the moving object;
    a display determiner changing a display mode of the display object in accordance with an amount of change in the relative distance when the information analyzer determines that the display obstacle exists between the display object and the moving object; and
    a display instructor instructing the display device to display the display object in the display mode changed by the display determiner,
    wherein the display determiner compares the amount of change in the relative distance with a first threshold value, and, when the amount of change in the relative distance is greater than the first threshold value, determines to display the display object, as a stereoscopic image, at a predetermined first position ahead of the moving object, the predetermined first position being on a portion of an area which extends from the moving object to the display obstacle, the portion being on a moving object side of the area.

2. The display control device according to claim 1, wherein the display determiner compares the amount of change in the relative distance with a second threshold value greater than the first threshold value, and, when the amount of change in the relative distance is greater than the second threshold value, determines to display the display object, as a planar image, at a position closer to the moving object than the first position.

3. The display control device according to claim 1, wherein the information analyzer determines whether or not the relative distance is less than a relative distance threshold value, and
    when the information analyzer determines that the relative distance is less than the relative distance threshold value, the display determiner determines to display the display object, as a planar image, at a position closer to the moving object than the first position, regardless of the amount of change in the relative distance.

4. The display control device according to claim 1, wherein the information analyzer determines a type of the display obstacle, and
the display determiner changes the display mode at a time when the display object is displayed as a stereoscopic image, in accordance with the type of the display obstacle.

5. The display control device according to claim 4, wherein when the type of the display obstacle is an uphill road, the display determiner sets an angle of elevation of the display object which is displayed as a stereoscopic image to an upward angle.

6. The display control device according to claim 4, wherein when the type of the display obstacle is a roadside fixed object, the display determiner changes a shape of the display object which is displayed as a stereoscopic image to match a shape of the roadside fixed object.

7. The display control device according to claim 4, wherein when the type of the display obstacle is a vehicle, the display determiner sets a position of the display object which is displayed as a stereoscopic image to either right or left of a position of the vehicle.

8. The display control device according to claim 7, wherein the moving object is a vehicle, and the display determiner determines to which one of the position to the right and the position to the left the position of the display object which is displayed as a stereoscopic image is changed on a basis of information about a lane of a road along which the moving object is traveling.

9. The display system comprising the display control device according to claim 1, further comprising:
the display device that can superimpose the display object, as the stereoscopic image, on the actual scene.

10. A display control method that is executed by a display control device that controls a display device that can superimpose a display object, as a stereoscopic image, on an actual scene, the display control method comprising:
by an information acquirer, acquiring information about a moving object and information about surroundings;
by an information analyzer, estimating a relative distance between a display obstacle and the moving object by using the information, and determining whether the display obstacle exists between the display object which is superimposed on an actual scene, and the moving object;
by a display determiner, changing a display mode of the display object in accordance with an amount of change in the relative distance when it is determined that the display obstacle exists between the display object and the moving object; and
by a display instructor, instructing the display device to display the display object in the display mode changed by the changing,
wherein the display determiner compares the amount of change in the relative distance with a first threshold value, and, when the amount of change in the relative distance is greater than the first threshold value, determines to display the display object, as a stereoscopic image, at a predetermined first position ahead of the moving object, the predetermined first position being on a portion of an area which extends from the moving object to the display obstacle, the portion being on a moving object side of the area.

11. The display control method according to claim 10, wherein the display determiner compares the amount of change in the relative distance with a second threshold value greater than the first threshold value, and, when the amount of change in the relative distance is greater than the second threshold value, determines to display the display object, as a planar image, at a position closer to the moving object than the first position.

12. The display control method according to claim 10, wherein the information analyzer determines whether or not the relative distance is less than a relative distance threshold value, and
when the information analyzer determines that the relative distance is less than the relative distance threshold value, the display determiner determines to display the display object, as a planar image, at a position closer to the moving object than the first position, regardless of the amount of change in the relative distance.

13. A non-transitory computer-readable medium storing a program that, when executed by a processor, causes the processor to perform a display control method to control a display device that can superimpose a display object, as a stereoscopic image, on an actual scene, the method comprising:
acquiring information about a moving object and information about surroundings;
estimating a relative distance between a display obstacle and the moving object by using the information, and determine whether the display obstacle exists between the display object which is superimposed on an actual scene, and the moving object;
changing a display mode of the display object in accordance with an amount of change in the relative distance when it is determined that the display obstacle exists between the display object and the moving object; and
instructing the display device to display the display object in the display mode changed by said to change the display mode,
comparing the amount of change in the relative distance with a first threshold value; and
when the amount of change in the relative distance is greater than the first threshold value, determining to display the display object, as a stereoscopic image, at a predetermined first position ahead of the moving object, the predetermined first position being on a portion of an area which extends from the moving object to the display obstacle, the portion being on a moving object side of the area.

14. The display control program according to claim 13, the method further comprising:
comparing the amount of change in the relative distance with a second threshold value greater than the first threshold value; and
when the amount of change in the relative distance is greater than the second threshold value, determining to display the display object, as a planar image, at a position closer to the moving object than the first position.

15. The display control program according to claim 13, the method further comprising:
determining whether or not the relative distance is less than a relative distance threshold value, and
when the relative distance is determined to be less than the relative distance threshold value, determining to display the display object, as a planar image, at a position closer to the moving object than the first position, regardless of the amount of change in the relative distance.

* * * * *